US009299013B1

(12) United States Patent
Curlander et al.

(10) Patent No.: US 9,299,013 B1
(45) Date of Patent: Mar. 29, 2016

(54) VISUAL TASK FEEDBACK FOR WORKSTATIONS IN MATERIALS HANDLING FACILITIES

(71) Applicant: Amazon Technologies, Inc., Reno, NV (US)

(72) Inventors: James Christopher Curlander, Mercer Island, WA (US); Robert Alexander Colburn, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 65 days.

(21) Appl. No.: 14/228,127

(22) Filed: Mar. 27, 2014

(51) Int. Cl.
*G06K 9/00* (2006.01)
*G06K 9/78* (2006.01)
*G06T 7/00* (2006.01)

(52) U.S. Cl.
CPC ............... *G06K 9/78* (2013.01); *G06T 7/0044* (2013.01)

(58) Field of Classification Search
CPC .............................. G06F 3/011; G06F 3/0317
See application file for complete search history.

(56) References Cited

U.S. PATENT DOCUMENTS

| | | | |
|---|---|---|---|
| 6,592,033 B2 | | 7/2003 | Jennings et al. |
| 6,803,928 B2 * | 10/2004 | Bimber et al. ................ 715/757 |
| 7,069,516 B2 * | 6/2006 | Rekimoto ..................... 715/757 |
| 8,350,675 B2 | 1/2013 | Riechel |
| 8,373,654 B2 | 2/2013 | Wang et al. |
| 8,589,824 B2 | 11/2013 | Hillis et al. |
| 2009/0114575 A1 * | 5/2009 | Carpenter et al. ............. 209/584 |
| 2011/0053688 A1 * | 3/2011 | Crawford et al. ............... 463/31 |
| 2013/0257751 A1 * | 10/2013 | Stafford ......................... 345/173 |
| 2013/0336524 A1 | 12/2013 | Zhang et al. |

OTHER PUBLICATIONS

International Journal of Computer Vision, "Mulit-View Stereo Reconstruction of Dense Shape and Complex Appearance", Hailin Jin, et al., 2005, pp. 175-189.
Computer Graphics Proceedings, Annual Conference Series, "The Office of the Future: A Unified Approach to Image-Based Modeling and Spatially Immersive Displays", Ramesh Raskar, et al., Jul. 19-24, 1998, pp. 1-10.

* cited by examiner

*Primary Examiner* — Tom Y Lu
(74) *Attorney, Agent, or Firm* — Robert C. Kowert; Meyertons, Hood, Kivlin, Kowert & Goetzel, P.C.

(57) ABSTRACT

Visual task feedback for workstations in a materials handling facility may be implemented. Image data of a workstation surface may be obtained from image sensors. The image data may be evaluated with regard to the performance of an item-handling task at the workstation. The evaluation of the image data may identify items located on the workstation surface, determine a current state of the item-handling task, or recognize an agent gesture at the workstation. Based, at least in part on the evaluation, one or more visual task cues may be selected to project onto the workstation surface. The projection of the selected visual task cues onto the workstation surface may then be directed.

20 Claims, 16 Drawing Sheets workstation visual feedback system 300

VISUAL TASK FEEDBACK FOR WORKSTATIONS IN MATERIALS HANDLING FACILITIES

BACKGROUND

The efficient movement, storage, and control of items is more important than ever. Advances in communicating orders for items have led to increased expectations as to the promptness in which these orders are fulfilled. Various suppliers, merchants, distributors, or other conveyors of goods, may operate materials handling facilities to store and move items to satisfy received orders as part of a fulfillment network. For example, electronic marketplaces, such as those accessible via the Internet, may include a catalog of items or products available for purchase. These items may be offered as the basis for commerce (e.g., sale or trade). Customers may utilize a web browser to visit a merchant's website, select an item for purchase from the catalog, and engage in a checkout process to finalize an order for the item. The merchant may operate a fulfillment network including various materials handling facilities in order to process such orders, such as a facility that maintains an inventory of items, picks the ordered item from inventory, and prepares shipments of the purchased item. A shipment carrier may acquire such shipments from the merchant and deliver the shipments to the respective purchasing customers.

Improvements to materials handling systems have increased the throughput in which items may be processed at materials handling facilities. For instance, automation techniques for processes such as storing and retrieving items from inventory, as well as conveying items within a materials handling facility, may improve the performance of these processes. Some processes, however, are less susceptible to improvements like automation. Consider processes with manually performed or assisted tasks; performance of the process may be limited to the capabilities of a human agent performing the respective task. As the capabilities of different human agents may vary widely, processes with manually performed or assisted tasks can be subject to inconsistent performance. When combined with processes operating with improved performance characteristics, like the aforementioned automation techniques, processes with manually performed or assisted tasks may reduce the overall effectiveness of such techniques.

Figure 1:
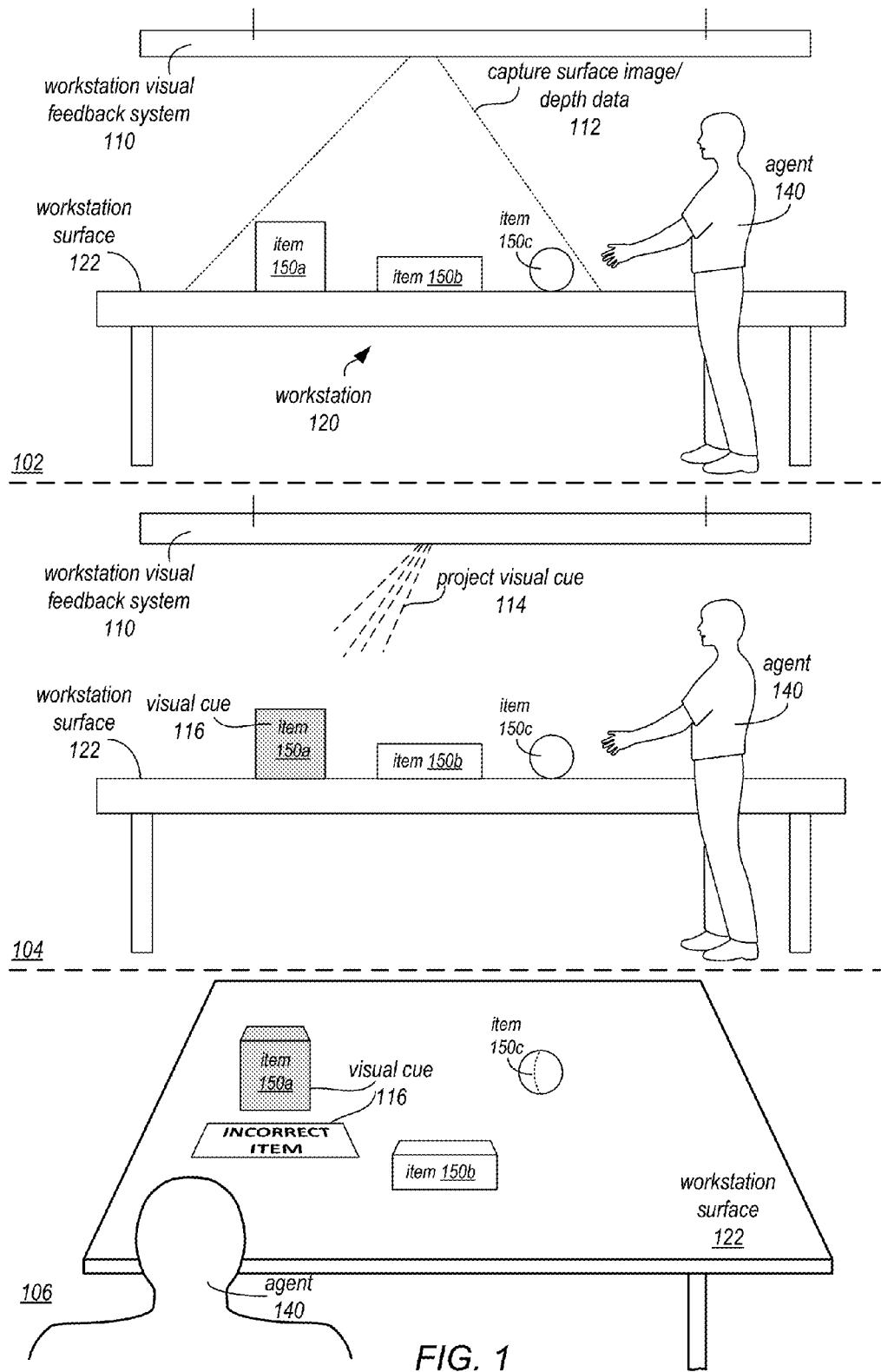
FIG. 1 is series of block diagrams illustrating visual task feedback for workstations in a materials handling facility, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement visual task feedback for workstations in a materials handling facility, according to various embodiments. Materials handling facilities may implement multiple processes to provide for the movement, storage, and/or control of items within the materials handling facilities. Some of these processes may include manually performed or directed item-handling tasks by operators, agents, or associates. In order to complete item-handling tasks, agents may receive information from many different sources. For instance, monitors, or other displays may show text, such as instructions. Other components or objects, such as physical documents, worksheets, tags, or manuals, as well as scattered indicators may convey some information pertinent to the performance of a task. As the process evolves to increase efficiency, agents may have less time to view or read information from multiple sources.

In various embodiments, a visual feedback system for a workstation may be implemented, streamlining and/or reducing the number of information sources an agent views in order to complete a task. For example, instead of dividing an agent's attention when performing a scanning procedure of items by scanning an item and then looking at a separate display to confirm the scan completed successfully, a visual cue indicating success or failure of a particular operation may be projected within the view of the agent such that the agent need not look away from the particular item or area being viewed as part of performing the operation. Different visual cues may indicate or provide the information necessary to perform a respective item-handling task so that viewing multiple different information sources may no longer be necessary for completion.

Item(s) upon which item-handling tasks are performed may be located on a workstation surface, such as a table, desk, shelf, or other surface, in various embodiments. A visual feedback system for the workstation surface may provide an augmented reality interface for the workstation, such that tasks performed at the workstation surface may be augmented according to the visual feedback system. In various embodiments, different imaging techniques may be implemented to capture image data for a workstation surface (e.g., a multi-model imaging RGBZ sensor). Based, at least in part, on the captured imaging data, individual product items on the workstation surface may be detected, segmented, and recognized using techniques including, but not limited to, image recognition/matching and bar-code recognition. Based, at least in part, on the identified items, visual cues indicating information pertaining to the items and/or item-handling task may be determined and projected. Image projection systems may then project the determined visual cues onto the workstation surface, to provide information to the agent.

FIG. 1 is series of block diagrams illustrating visual task feedback for workstations in a materials handling facility, according to some embodiments. Workstation 120 may be a workstation for the performance one or more item-handling tasks in a materials handling facility (various examples of which are given below with regard to FIG. 2, such as picking, stowing, packing, or sorting). Different items 150, such as items 150*a*, 150*b*, and 150*c*, may be collected and/or located on a workstation surface 122 which may be a desk, table, shelf, or any other surface for holding items 150 as part of performing the item-handling task. Agent 140 may be responsible for performing or directing the performance of the item-handling task with regard to items 150.

Workstation visual feedback system 110 may be implemented at workstation 120 in order to perform various techniques for providing visual feedback for item-handling tasks performed by agent 140. In some embodiments, workstation visual feedback system may include one or more imaging and/or depth sensors, scales, projectors, audio speakers, agent tracking sensors, or other components to implement visual feedback techniques. Components of workstation visual feedback system 110 may be fixed, as illustrated in FIG. 1, at a particular station, such as mounted or located above workstation surface 122. While in other embodiments, some components of workstation visual feedback system 110 may be separately located, with projection components, for instance located on the workstation surface or, using wearable technology, located on or worn by agent 140.

As illustrated in scene 102, imaging sensors (not shown) may capture surface image and/or corresponding geometric (e.g. as may be determined based on depth data) data 112 of workstation surface 122. For example, a high-resolution camera implemented as part of workstation visual feedback system 110 may capture a real-time or near real-time stream of image data of a workstation surface. Items 150, or other objects within the field of view for imaging sensors, may be captured. For instance, as illustrated in scene 102, items 150*a*, 150*b*, and 150*c* are captured within the field of view of the image sensor(s). In some embodiments, geometric information, either captured through a separate or the same imaging sensor, corresponding to the image data that may be obtained. For example, a time-of-flight camera may provide depth data corresponding to the distance between the camera and the object in each portion of the image which may be used to construct geometry information for the workstation surface. Thus, geometric information corresponding to the image data of workstation surface 122 may be able to distinguish between the relative heights of item 150*a*, surface 122, item 150*b*, and item 150*c*, each of which may be different.

Once image data for workstation surface 122 is captured, the image data may be evaluated to identify items 150 located on workstation surface 122. For example, item matching techniques may be employed by accessing a data store that maintains item description information, such as item image information, upon which a comparative analysis may be performed to identify the item. In some embodiments, additional information, such as geometric information or weight information of items 150 may also be used to identify items 150. In some embodiments, the image data may be evaluated to identify a current state of the item-handling task being performed at workstation 120, which may provide the state of, or other information concerning the progress of an item-task. For example, at a packing workstation, a packing container (e.g., a box) may be identified based on the captured image data, indicating that a packing step is to begin, in progress, or complete. Evaluation of the image data may also be performed, in various embodiments to recognize agent gestures with regard to the performance of the item-handling task. For instance, certain motions may be recognized as various steps in the performance of an assembly task or detected as input for user interfaces (which may be projected onto workstation surface 122).

Once the image data is evaluated, various different visual task cues may be selected or determined to project onto workstation surface 122, in some embodiments, based, at least in part on the evaluation of the image data. For example, scene 104 illustrates a visual cue projection 114 onto workstation surface 122 (and/or onto item 150*a*) to illustrate a visual cue 116 with regard to item 150*a*. Visual cue 116 may convey information to agent 140 about item 150*a*, such as whether the item is incorrect (e.g., as illustrated in scene 106), extraneous, unrecognizable (which may require further recognition action, such as manually scanning or identifying the item), or particular task instructions for the item. In various embodiments, projection of visual cue 114 may be performed by one or more image projection systems to display visual cue 116 according to the image data of the workstation surface. For instance, the projection may be registered with the original scene of image data upon which the selection and projection of the visual cue was based. The visual cue may be projected toward the location of item 150*a*, for example, based on the location of item 150*a* on workstation surface 122 as described in the captured image data 112. In some embodiments, multiple projection systems may be used to project visual cue 114 in order to adjust the projection 114 in the event of a change in workstation surface 122 (e.g., agent 140 occludes the projection in some way, such as blocking the projection with a limb, or placing an object or other item in the path of projection 114).

As scene 106 also illustrates, textual information associated with visual cue 116 may be projected, displaying the text "INCORRECT ITEM." In some embodiments, the projection may be made based on a viewing perspective of agent 140. For instance, if agent 140 has moved locations with respect to workstation surface 122 and item 150*a* between scenes 104 and 106, the projection may be adjusted so that the textual information is displayed at an orientation that may be read by agent 140. For instance, agent 140 in scene 106 is now directly across from item 150*a* (when agent 140 was further away and at an angle from item 150*a* in scene 104). From agent 140's viewing perspective, visual cue 116 is oriented to be readable. In some embodiments, visual cue 116 may provide a user interface projected onto workstation surface 122, which may allow agent 140 to interact with the user interface via inputs on the surface of 122, for example with a touch input onto the user interface projection, visual indicator (e.g., laser pointer), or gesture (e.g., placing finger over a particular input control). Workstation visual feedback system 110 may be configured to interpret imaging data of the interaction of agent 140 with the projected user interface to detect input, selections, and other indications proffered via the user interface.

Please note that previous descriptions are not intended to be limiting, but are merely provided as an example of a workstation, workstation surface, and/or workstation visual feedback system. For example, different components of workstation visual feedback system 110 may be differently located. Other differences may include changes to the physical layout or arrangement of workstation 120 and/or workstation surface 122. The workstation surface, for instance may be irregular, multi-level, or oriented in a different angle. In some embodiments, the workstation surface may appear to be vertically oriented. Visual cues projected onto workstation surface 122 may also be different than illustrated in FIG. 1.

This specification begins with a general description of a materials handling facility implementing visual task feedback for workstations implemented as part of the materials handling facility. Different item-handling tasks or processes in the materials handling facility may, in some embodiments, implement visual task feedback for respective workstations that implement these item-handling tasks or processes. Then various examples of a visual feedback system for a workstation in a materials handling facility are discussed, including different components/modules, or arrangements of components/module that may be employed as part of providing visual cues. A number of different methods and techniques to perform visual task feedback for workstations in a materials handling facility are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
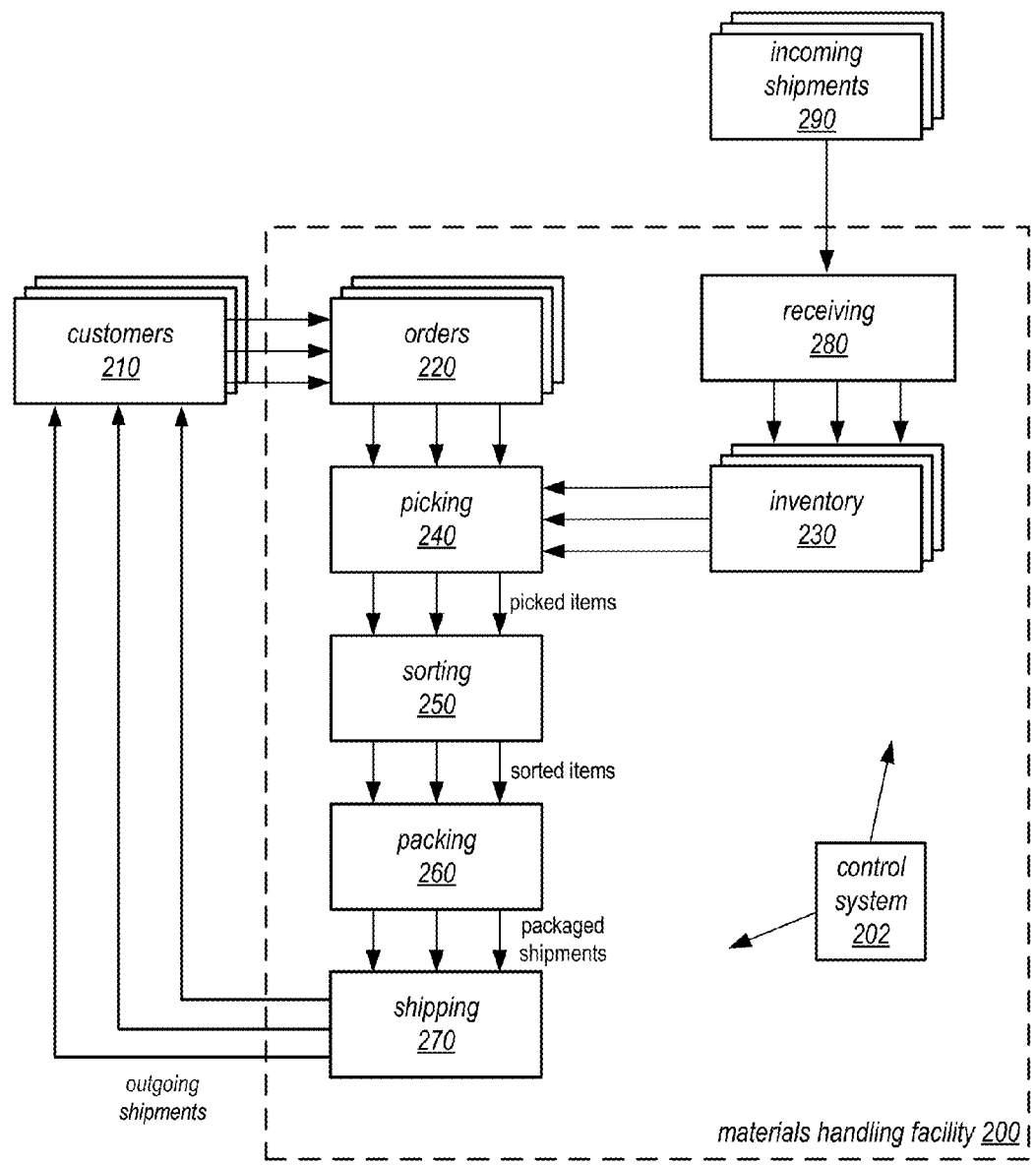
FIG. 2 is a block diagram illustrating a logical representation of a materials handling facility, according to some embodiments.

FIG. 2 is a block diagram illustrating a logical representation of a materials handling facility, according to some embodiments. In various embodiments, a fulfillment network including multiple materials handling facilities (each of which may be configured in a manner similar to that of materials handling facility 200) may be responsible for fulfilling multiple orders, such as orders placed through an electronic commerce ("e-commerce") portal.

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, FIG. 2 may illustrate an order fulfillment center of a product distributor, according to some embodiments. Multiple customers 210 may submit orders 220 to the product distributor through an e-commerce portal or other electronic marketplace, where each order 220 specifies one or more items from inventory 230 to be shipped to the customer that submitted the order. To fulfill the customer orders 220, the one or more items specified in each order may be retrieved, or picked, from inventory 230 (which may also be referred to as stock storage) in the materials handling facility, as indicated at 240. Picked items may be delivered or conveyed, if necessary, to one or more workstations in the materials handling facility for sorting 250 into their respective orders, packing 260, and finally shipping 270 to the customers 210.

Each item stored in inventory 230 may include an item identifier. The term item identifier may refer to a unique identifier associated with each particular type of item carried in inventory 230 of a materials handling facility 200. Multiple items of the same type of item may be carried in inventory 230. Typically, but not necessarily, each item is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual items within a type of item.

Cases, boxes, bundles, or other collections of items may similarly be marked or tagged with item identifiers. The items in a collection may all be of the same type of item, for example a case of twelve items of a particular item type, or may be a collection of one or more items of each of two or more heterogeneous item types. A collection of item(s) (e.g., a case containing twelve items, or a bundle containing one or more items of each of two or more heterogeneous item types, such as a boxed or bundled set of three different books) may thus be considered or treated as an "item" in the materials handling facility 200. A designation, or code, may thus also identify a collection of items as an "item" in the order fulfillment process. Thus, various processes, in addition to sorting individual items, may also process a collection of items designated as an item. Therefore, the conveyance receptacles described herein may receive collections of items that are designated as an item as well as individual items.

As noted above, in various embodiments, picked items may be delivered to an induction workstation. Induction workstations may perform various item handling processes or tasks, in some embodiments. For instance, at the induction station, individual items may be associated with and placed into particular conveyance receptacles. The item may be associated with the particular conveyance receptacle it is placed in. In some embodiments, the association of an item with a particular conveyance receptacle may be performed by reading, scanning or otherwise entering an item identifier associated with the item and a conveyance receptacle identifier associated with the particular conveyance receptacle into which the unit is placed. The item identifier and receptacle identifier may be communicated to control system 202 of the materials handling facility via wired and/or wireless communications. Each conveyance receptacle may include a unique conveyance receptacle identifier that uniquely identifies the particular conveyance receptacle in the materials handling facility. The conveyance receptacle identifier may, for example, be indicated by a bar code, Radio Frequency Identifier (RFID) device, or some other scannable or readable mechanism, mark, or tag attached to or integrated with the conveyance receptacle.

In some embodiments, the conveyance receptacles may then be routed to particular destinations for the items contained within the receptacles in accordance with the requests (orders) currently being processed. For example, sorting workstations may be implemented to sort items into respective orders. Streams or batches of incoming items may arrive at a sorting station and be grouped or placed in respective containers, modules, bins, slots, or other receptacles corresponding to a particular order. In some embodiments, various item-handling tasks, similar to those described above with induction may be performed, such as reading, scanning or otherwise entering an item identifier associated with the item and a sorting receptacle identifier associated with the particular sorting receptacle into which the unit is placed. In some embodiments, robotic or automated transport systems may convey items in vertical storage containers with multiple slots for storing items. An item-handling process may be taking items from or placing items into the vertically oriented storage containers.

An order may then proceed to a packing workstation, in some embodiments, to be packaged for shipping 270, under direction of a control system (e.g., control system 202). At each packing station, shipments of items (e.g., shipment) may be packed into a respective shipping container (e.g., corrugated box or other shipping container) for shipment from the materials handling facility. Prepared shipments may be processed at shipping 270 and conveyed to a shipment carrier for delivery to respective customers. A picked, packed and shipped order does not necessarily include all of the items ordered by the customer; an outgoing shipment to a customer may include only a subset of the ordered items available to ship at one time from an inventory storage location.

A materials handling facility may also include a receiving 280 operation for receiving shipments 290 of stock (e.g., units of inventory items) from one or more sources (e.g., vendors) and for moving or "stowing" the received stock into stock storage (e.g., inventory 230). The receiving 280 operation may also receive and process returned purchased or rented items or orders from customers. At least some of these items are typically returned to inventory 230. The various operations of a materials handling facility may be located in one building or facility, or alternatively may be spread or subdivided across two or more buildings or facilities. In various instances, it should be understood that references to elements, units, items, processes (or anything else) as being located within materials handling facility 200 may easily be extended to encompass elements, units, items, processes (or anything else) proximate to but not physically located within materials handling facility. For example, various elements, units, items, or processes (or anything else) may be implemented outside of the materials handling facility, according to some embodiments.

In various embodiments, shipments of one or more items at shipping 270 may be transferred to one or more shipment carrier network(s). Each shipment carrier's network may include one or more distribution facilities for storing items as well as vehicles for conveying shipments from such distribution facilities and/or materials handling facilities (such as materials handling facility 200) to various destinations (e.g., customer specified destinations).

Figure 11:
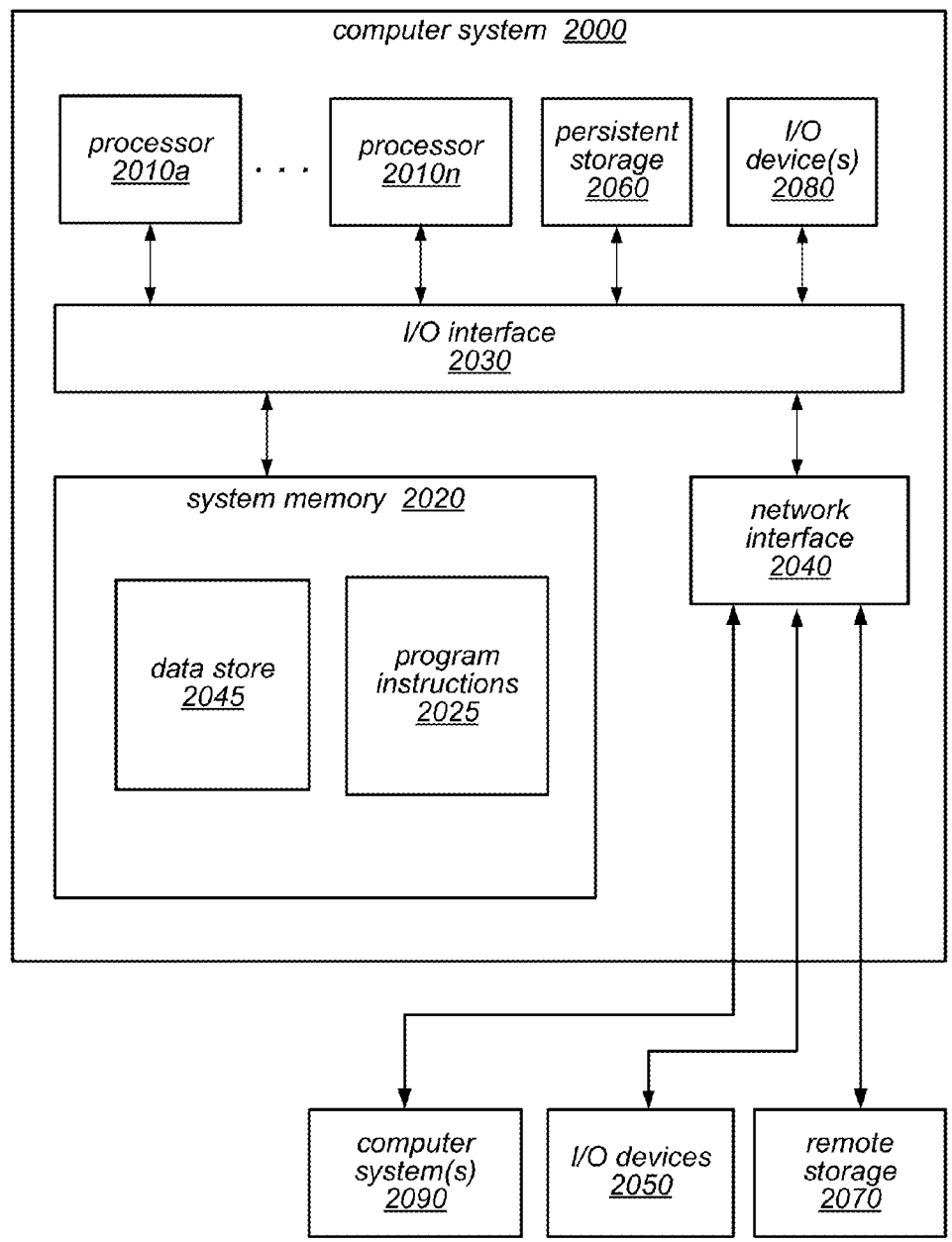
FIG. 11 is a block diagram illustrating an example computing system, according to some embodiments.

A materials handling facility may include a control system 202 which may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, radio frequency identification (RFID) tags, etc.) on individual items or collections of items (e.g., cases) and communicate with a control station or stations of the control system to, for example, determine and record the item and/or item type of the items. The hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles. An exemplary computer system that may be used in a control system 202 is illustrated in FIG. 11.

Control system 202 may manage or direct the performance of various operations, processes, or item-handling tasks in materials handling facility 200 to efficiently utilize resources of the materials handling facility without exceeding known constraints of the materials handling facility. For example, control system 202 may manage the flow of items throughout materials handling facility 200. In some embodiments, control system 202 may direct or monitor the performance of various other systems in materials handling facility 200, such as a workstation visual feedback system described below.

Figure 3:
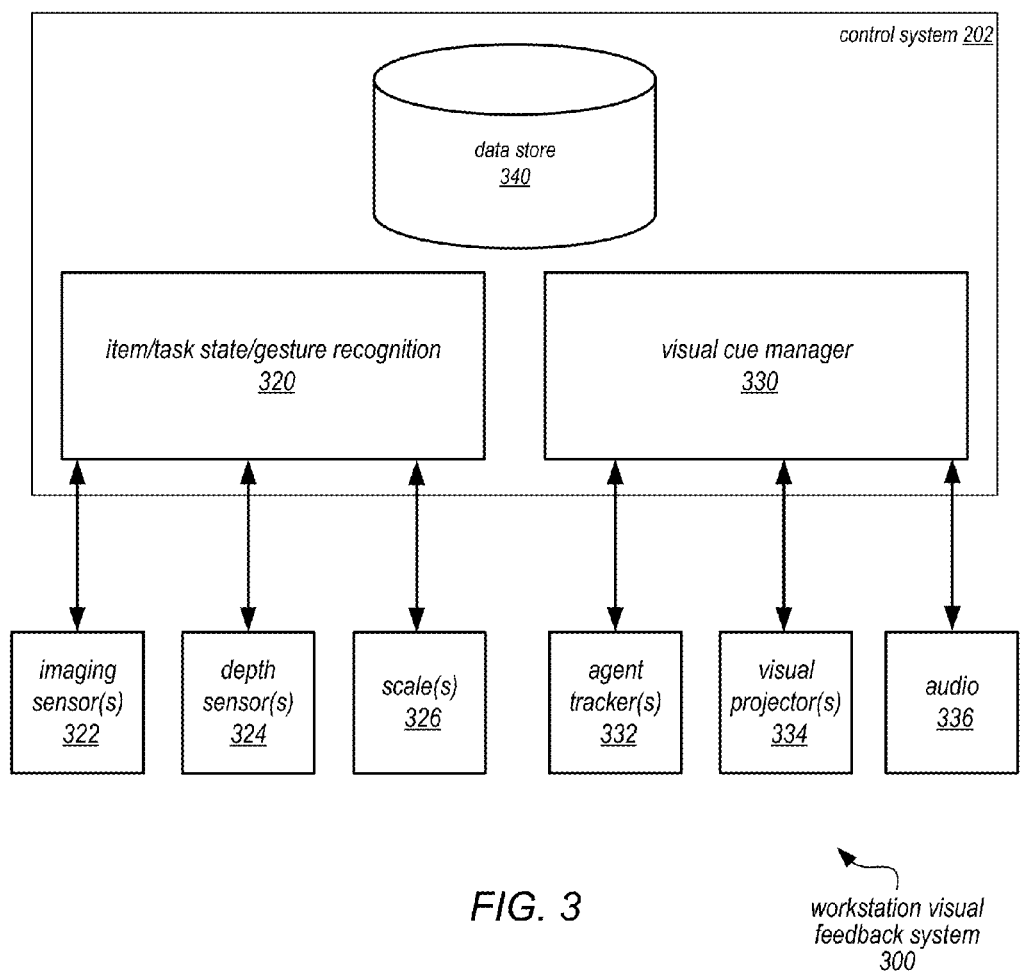
FIG. 3 is a block diagram illustrating a logical illustration of a workstation visual feedback system, according to some embodiments.

FIG. 3 is a block diagram illustrating a logical illustration of a workstation visual feedback system, according to some embodiments. Workstation visual feedback system(s) 300 may implement different respective sensors to capture data with regard to a workstation surface, such as imaging sensor(s) 322, depth sensor(s) 324, and scale(s) 326 that may be communicated to control system 202 through various wired or wireless communication technologies. Control system 202 may be configured to make various determinations as to the current state of an item-handling task performed on a workstation surface and/or perform different item recognition techniques to identify items on the workstation surface based on the captured data and information obtained from data store 340. Agent gestures, or other changes in the workstation environment (e.g., area around the workstation surface) may also be recognized. Visual task cues to project may be selected based on the identified items and/or state of the item-handling task. Visual projector(s) 334 may then project the selected visual task cues onto the workstation surface as directed by control system 202. Visual projectors may be any form of light-based projection that projects image data (e.g., a video signal) onto the workstation surface (e.g., CRT projector, liquid crystal display (LCD) projector, digital light processing (DLP) projectors, or any other projection technology). In some embodiments, visual projectors may also include other display technologies which may create the appearance of projections on the workstation surface from the viewing perspective of an agent (e.g., where the workstation surface itself incorporates a surface display, or wearable display technology such as a heads up display (HUD)). Control system 202 may again communicate with agent trackers 332, visual projector(s) 334, and audio 336 over wired or wireless communication technologies.

In various embodiments, control system 202 may implement an item/task/input recognition module 320 to perform item identification/recognition, task state recognition, or gesture recognition (e.g., for a user input such as may be projected onto a workstation surface as part of workstation visual feedback system(s) 300 or task performance analysis). For example, item/task/input recognition module 320 may be configured to perform one or more different image recognition, computer vision, or object recognition techniques, such as edge matching, feature detection, or template matching, to identify items located on a workstation surface by evaluating image data of the workstation surface received from imaging sensor(s) 322 and/or depth sensor(s) 324, as well as other information from sensors such as scale(s) 326. In some embodiments, items/task/input recognition module 320 may be configured to identify barcodes, labels, or other item identifiers located on items. Data store 340 may maintain descriptive information about items carried in a materials handling facility (e.g., images, physical characteristics, such as height, length, width, weight, or item identifier numbers). Thus, depth information obtained from depth sensor(s) 324 corresponding to imaging data from imaging sensor(s) 322 may be used to determine geometric information (e.g., the length, width, and/or height of items), for example. Scale(s) 326 may provide weight information, either of individual items on a workstation surface, or the total weight of items on a workstation surface as a whole. In some embodiments, item/task/gesture recognition module 320 may also be configured to perform various video tracking techniques to track and determine the current state of an item-handling task being performed by an agent at a workstation. Data store 340 may also include information pertaining to the performance of item-handling tasks in order to determine the current state of the item-handling task. Similarly, item/task/gesture recognition module 320 may evaluate the image data to recognize gestures associated with the performance of a task.

Figure 8:
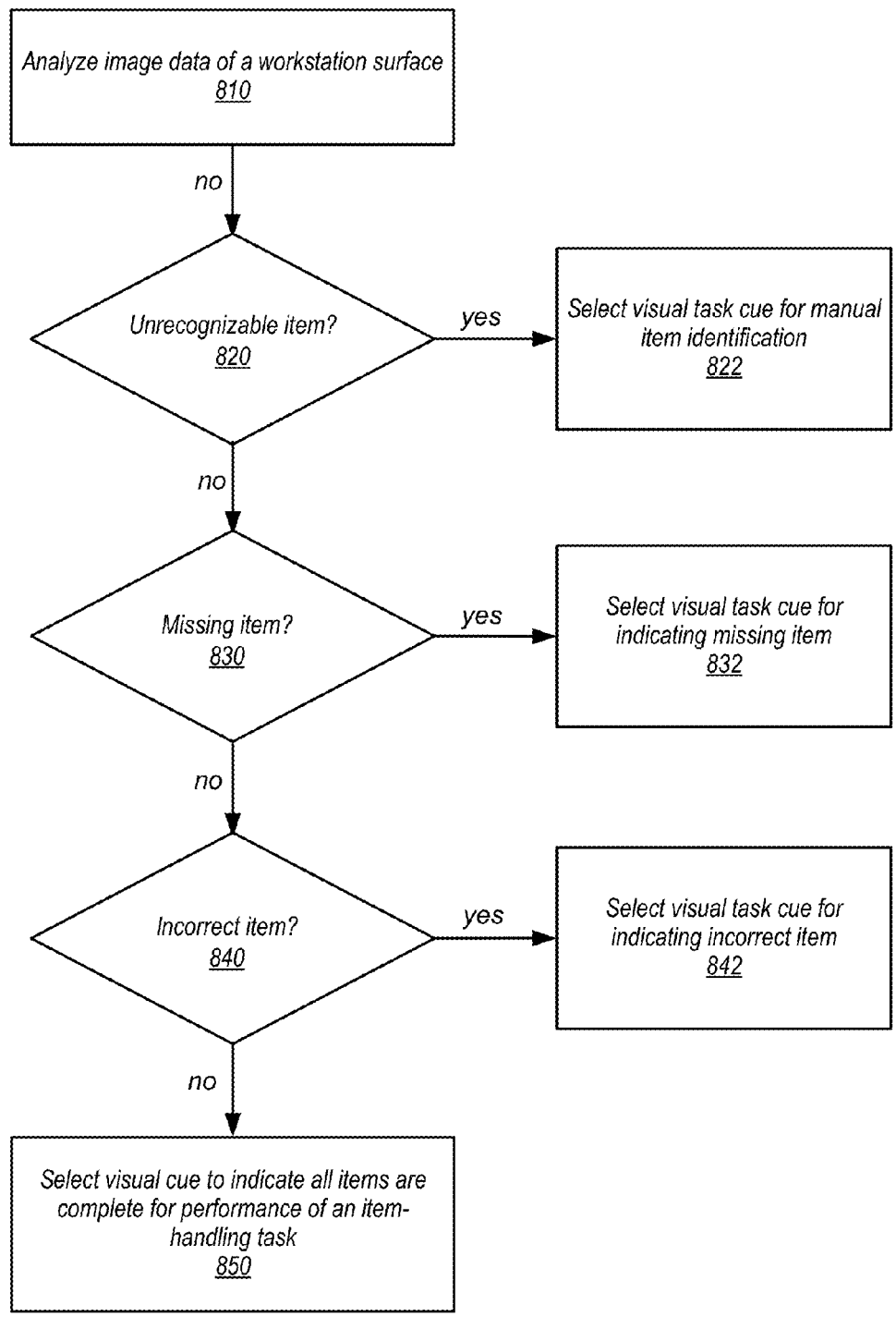
FIG. 8 is a high-level flowchart illustrating various methods and techniques for selecting a visual task cue to be projected onto a workstation surface, according to some embodiments.

Visual cue manager 330 may be implemented at control system 202 to select, generate, modify, and otherwise manage visual task cues. Visual cue manager may receive items identified by item task input manager 320 and make a selection of a visual task cue to provide feedback at the workstation surface. Data store 340 may be accessed to identify a listing of items associated with the particular item-handling task being performed (e.g., items associated with a particular order or product assembly task). Missing items, incorrect items, or unrecognizable items may be determined. FIG. 8, discussed below, provides examples of various different techniques that visual cue manager 330 may implement to select a visual task cue. Once selected, visual task cue manager 330 may direct visual projector(s) 334 to project the selected visual task cue. In some embodiments, agent tracker(s) 332 may provide location information of the agent to visual cue manager 330. Visual cue manager 330 may also determine appropriate visual cues for the current state of task that is determined by item/task/gesture recognition module 320 or for recognized gestures by item/task/gesture recognition module 320.

Figure 9:
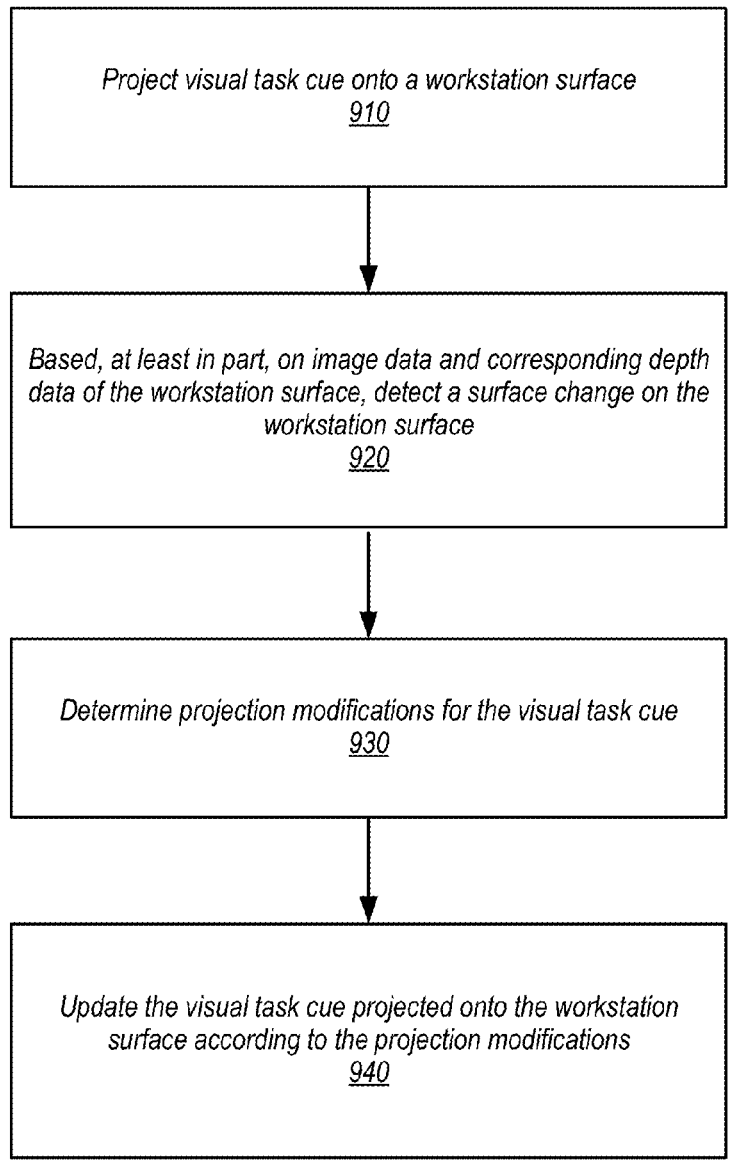
FIG. 9 is a high-level flowchart illustrating various methods and techniques for adjusting projected visual task cues based on additional image and geometric information for a workstation surface, according to some embodiments.

Visual cue manager 330 may determine a viewing perspective for the agent according to which currently projected visual task cues may be updated to be projected in accordance with the perspective, or a new visual task cue to be projected in accordance with the determined perspective. Visual cue manager may implement the various techniques described below with regard to FIG. 10 to project visual task cues according to agent perspective. Visual cue manager 330 may also modify or update projected visual task cues according to detected surface changes (which although not illustrated may be determined based on geometric or depth information from depth sensors 324) or other workstation environment changes (e.g., object or agent obstruction within the workspace, such as the area between projectors and the workstation surface). FIG. 9, described below, provides many examples of techniques which visual cue manager 330 may implement to adjust projected visual task cues. In some embodiments, visual cue manager 330 may also be configured to interpret input for user interfaces projected as visual cues onto a workstation surface, such as discussed below with regard to FIG. 8.

Workstation visual feedback system 300 may, in some embodiments, be integrated with a materials handling facility control system, such as materials handling facility control system 202 described in FIG. 2. Different ones of the various workstations (e.g., receiving, stowing, inducting, sorting, or packing) may implement a respective workstation visual feedback system 300, in some embodiments. In some embodiments, visual workstation feedback system(s) 300 may be implemented at particular types of workstations (e.g., implemented at packing workstations).

Figure 4:
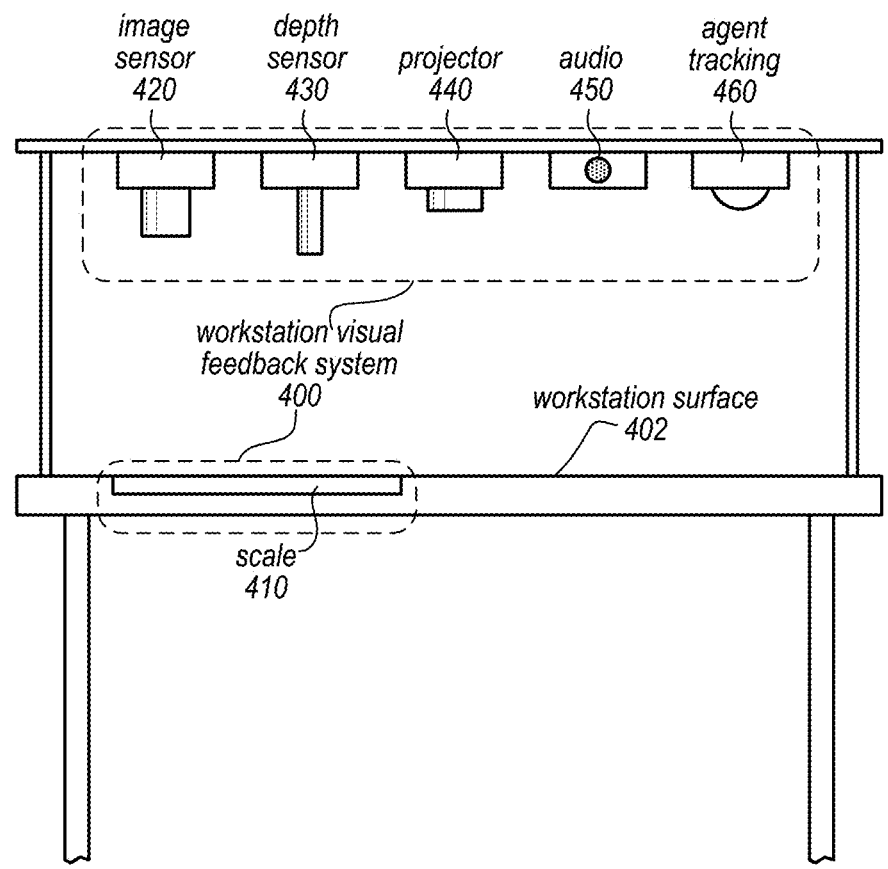
FIG. 4 is a diagram illustrating a workstation implementing a workstation visual feedback system, according to some embodiments.

FIG. 4 is a diagram illustrating a workstation implementing a workstation visual feedback system, according to some embodiments. Workstation visual feedback system 400 may be implemented as fixed or workstation-based feedback system. In some embodiments, a control system may be located at or near the workstation, or may be separately located and in communication with the other components illustrated in FIG. 4. In various embodiments, one or more image sensors 420 may be located in such a way as to have a view of workstation surface 402. For example, in some embodiments, image sensors 420 (as well as the other components) may be located above workstation surface 402. For workstation surfaces 402 with a different orientation (e.g., a vertical orientation), the imaging sensors may also be located in such a way as to have a view of the workstation surface 402 that may be different than above the workstation surface.

Image sensors 420 may be one or more digital still image and/or video cameras, configured to capture and/or monitor workstation surface 402. Image data captured by image sensors 420 may be formatted according to one or more different formats and/or captured at one or more different image resolutions. In some embodiments, multiple image sensors 420 may capture data of the workstation surface, with each sensor responsible for some or all of workstation surface 402. In some embodiments, image sensors 420 may be located in different positions with different vantage points of workstation surface 420. One or more depth sensors 430 may be implemented, in some embodiments. For example, time-of-flight cameras, plenoptic or light-field cameras, stereo cameras implementing triangulation, or any other range imaging sensor that may provide depth information (or geometric information) between the depth sensor 430 and the workstation surface may be implemented. In some embodiments, imaging sensors 420 may include the capabilities of depth sensor 430, and thus one device may capture both image data and depth information. In some embodiments, the imaging sensors 420 may use various techniques for constructing geometric information of the workstation surface and/or the environment surrounding the workstation surface (e.g., using multiple images or other stereo reconstruction techniques). In some embodiments, a scale 410 may be implemented to obtain weight information for items located on workstation surface 402.

One or more projectors 440 may be implemented to project visual task cues onto workstation surface 402. These projectors may simply produce laser or other simple pointer imagery, or may be configured to project various colors, shapes, sizes, or animations as the visual task cues. Audio 450 may be one or more audio speakers configured to provide audio cues in addition to and corresponding to projected visual task cues. Agent tracking sensor 460 may be a sensor configured to determine agent location information, such as the current location of an agent's body, head, eyes, or gaze.

Although illustrated in FIG. 4 as a workstation-based visual feedback system, in some embodiments, one or more components may be implemented in another location. For example, various forms of wearable technology, such as a heads-up display (HUD), may be worn by an agent and projections may be configured to display on the wearable technology in such a way that it appears that the visual task cue is projected onto the workstation surface from the perspective of the agent wearing the wearable technology. In some embodiments, a surface-based projector may be implemented such that the very surface of the workstation may be configured to display visual task cues onto itself.

FIGS. 5A-5F are diagrams illustrating different visual cues projected onto a pack workstation surface, according to some embodiments. Pack station 500 is configured to allow an agent, agent 525, to perform an item-handling task, a packing process to pack items 570 together into a shipping container. Items 570 are located on pack station surface 540 for performance of the packing process. Visual feedback system 510 (or a portion thereof) including various imaging and/or depth sensors, as well as projectors, audio speakers, and/or agent tracking sensors may be implemented in a fixed position above workstation surface 540. Agent 525 packs items into shipping containers and places the packed container 590 onto conveyer mechanism 580 to be conveyed to another location in a materials handling facility. Container inventory 530 may include shipping containers of varying sizes and/or properties that may be used to perform the packing process.

Figure 5A:
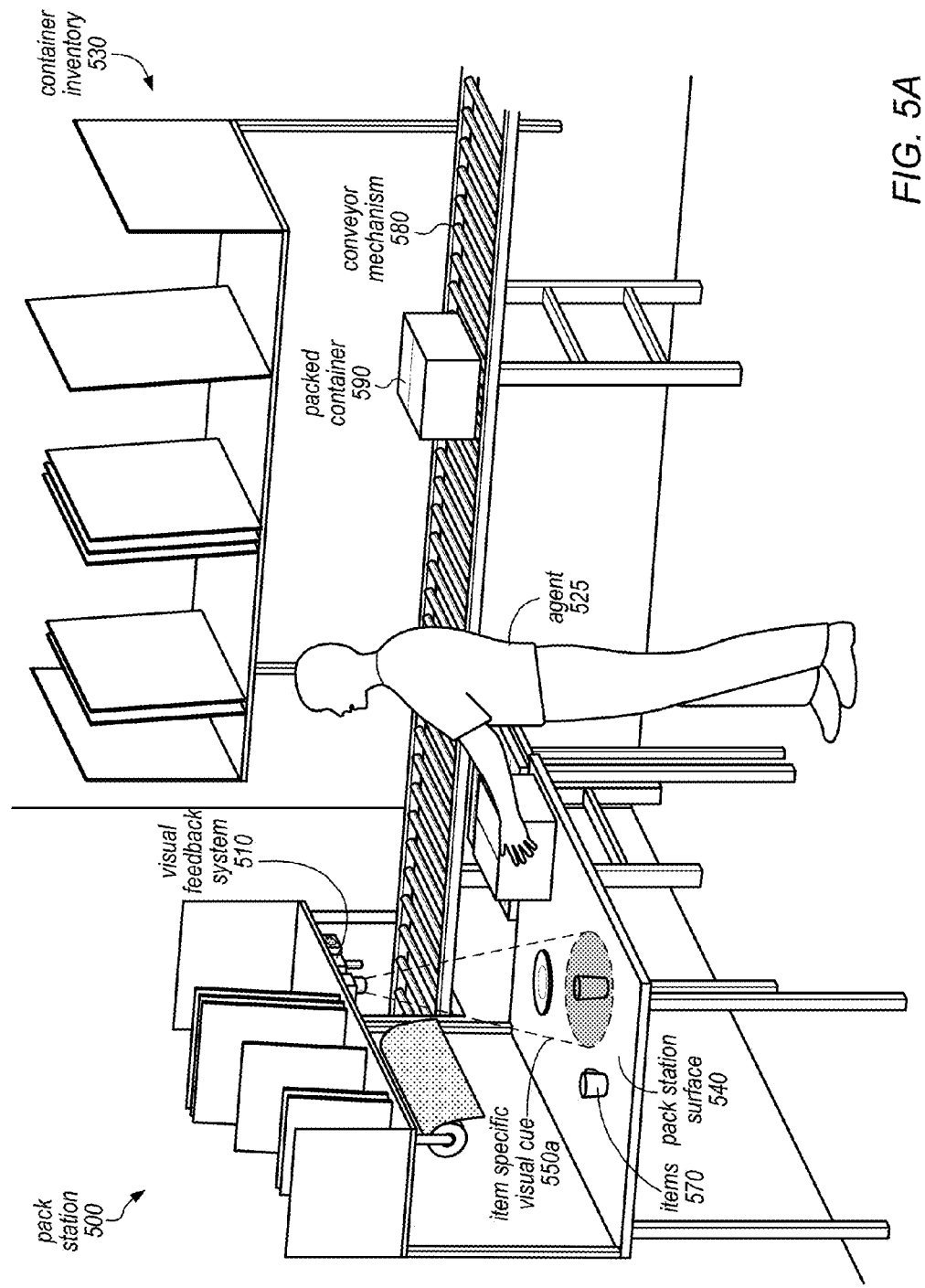
FIGS. 5A-5F are diagrams illustrating different visual cues projected onto a pack workstation surface, according to some embodiments.

In FIG. 5A, visual feedback system 510 has projected an item-specific visual cue 550a onto one of items 570 (as illustrated by the shaded area). This type of visual cue may convey one or more indications to agent 525. For instance, the item may not be recognized by visual feedback system and require manual entry, or the item may be the wrong item to pack. In some embodiments, the item-specific visual cue 550a may indicate that the highlighted item is to be the first packed into a shipping container.

Figure 5B:
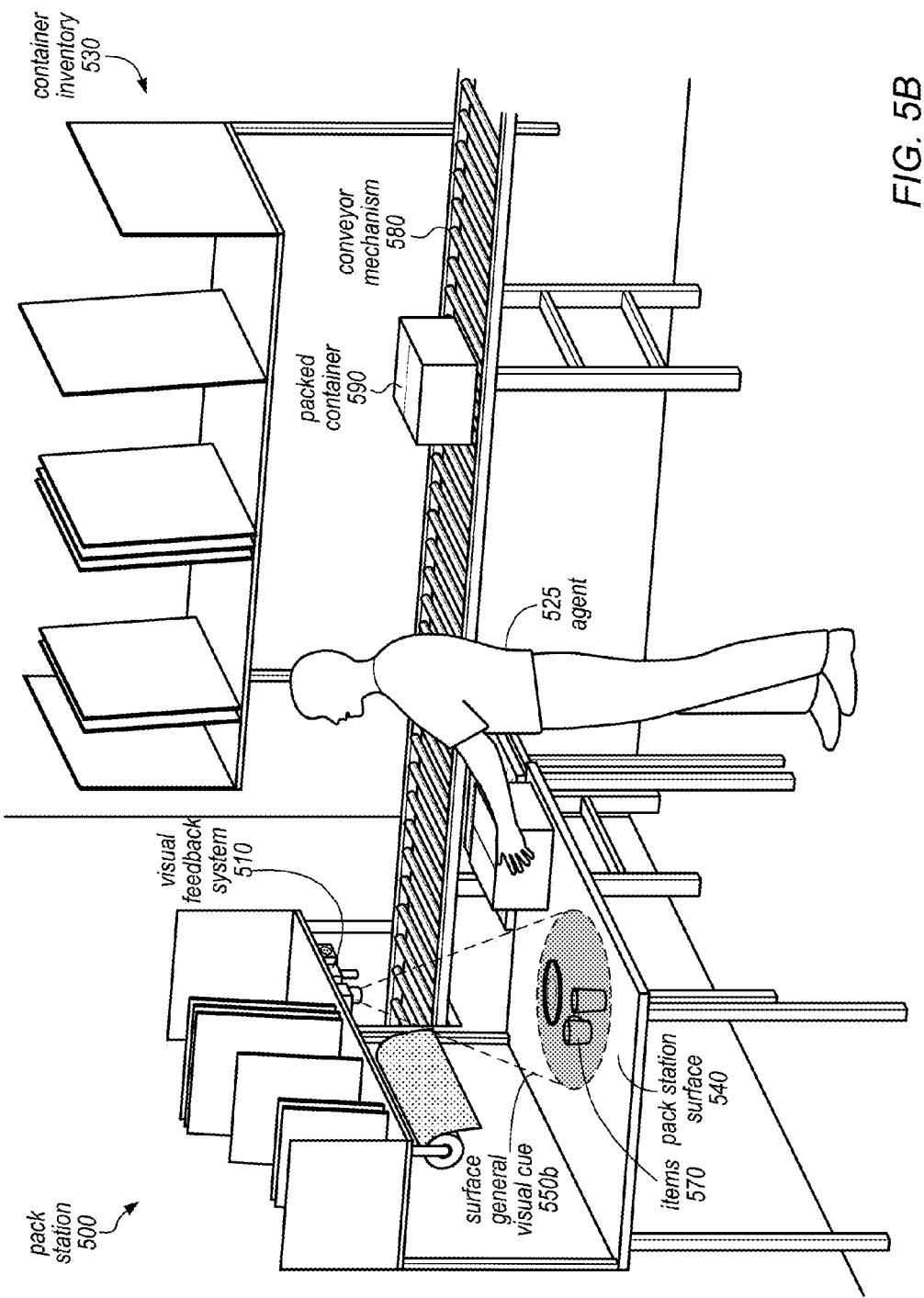

FIG. 5B illustrates another type of visual task cue, a surface general cue 550b. For instance, in some embodiments, a visual task cue may be projected onto a general or entire area of pack station surface 540. This may indicate several things. For example, the surface general cue may provide a halt or proceed indication (e.g., by projecting a red or green object onto the workstation surface) corresponding to a current state of the task (e.g., not all items are packed). The surface general cue 550b may indicate items remaining to be identified, packed, or some other operation performed upon, which after completion the portion of the visual cue highlighting that item may be removed until tasks for the all of the items are complete and no item remains highlighted.

Figure 5C:
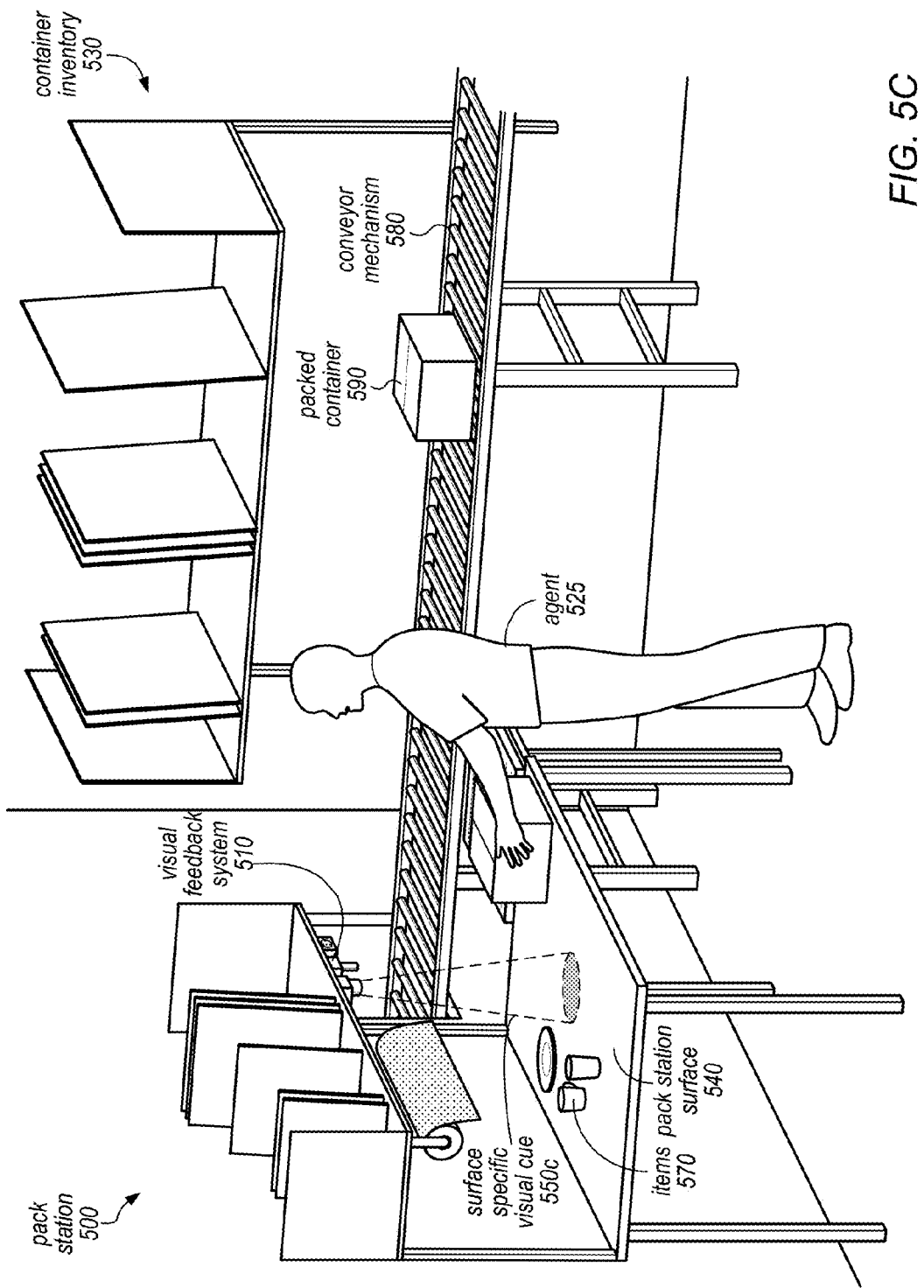
Figure 5D:
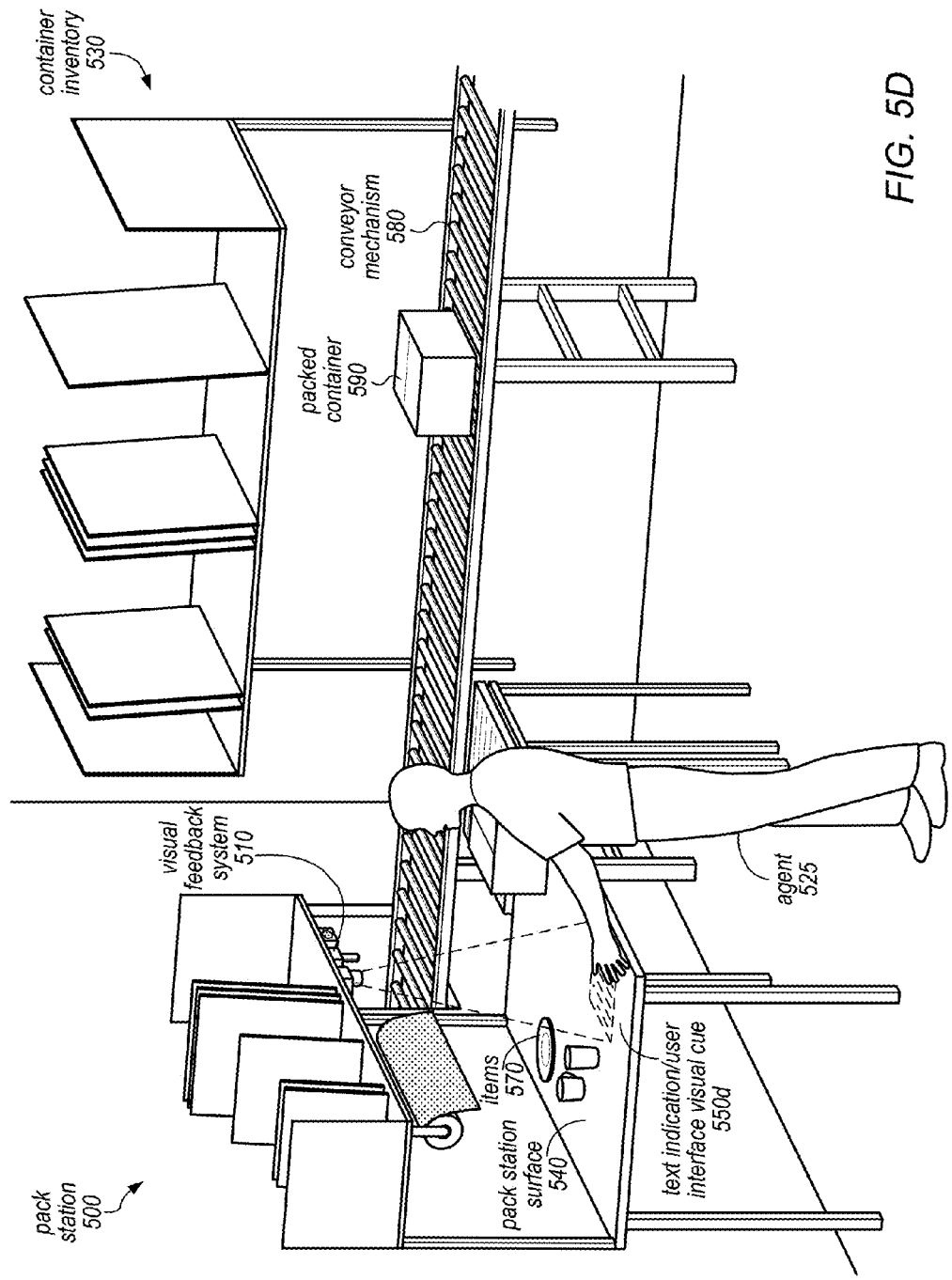

FIG. 5C illustrates another type of visual task cue, a surface specific task cue 550c. A surface specific task cue may indicate that a particular item is missing, or should be located where the visual task cue 550c is located. FIG. 5D illustrates another type of visual task cue, a text indication/user interface visual cue 550d. As noted above, textual information describing next steps, current errors, other item-task handling instructions may be projected onto station surface 540. In this way, agent 525 need not look away to a different monitor, book, or other information source to obtain information. Instead, agent 525 may maintain focus on the area in which agent 525 is currently working User interface cue 550d may be a user interface which allows agent to provide input, such as by touching or hovering over one or more input objects within the projected user interface 550d. Again, agent 525 need not look away or interact with a different display system to provide input.

Figure 5E:
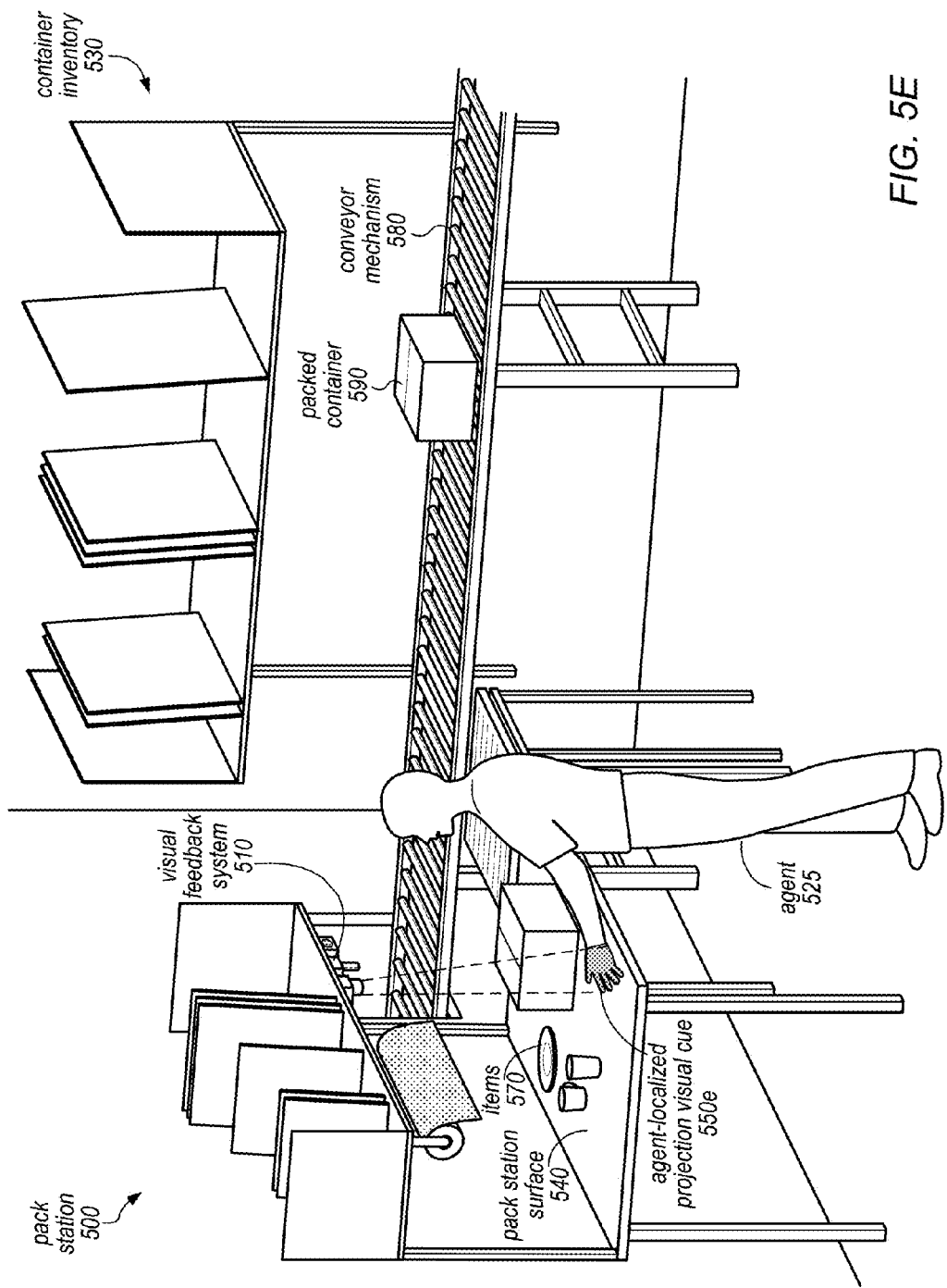
Figure 5F:
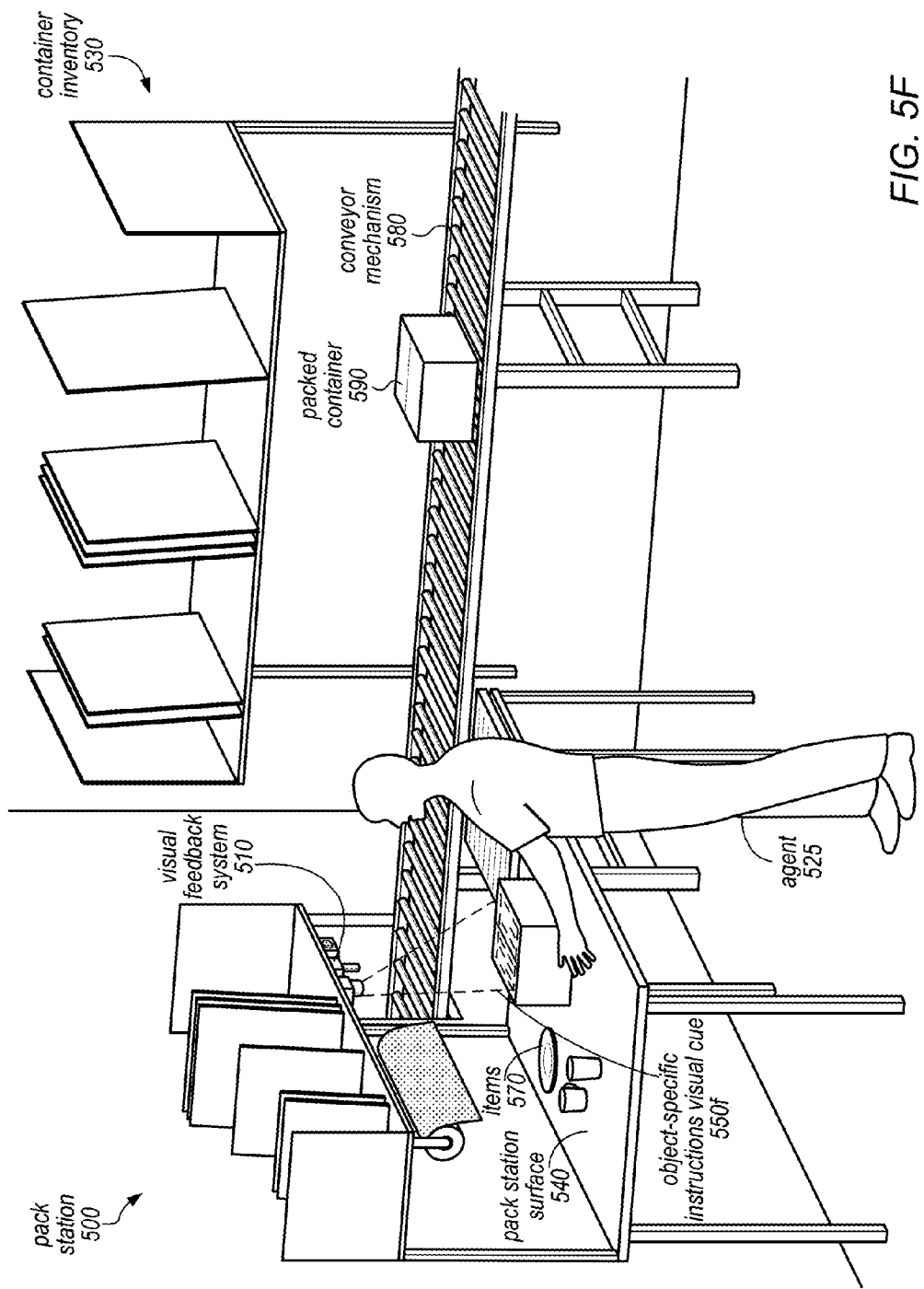

FIG. 5E illustrates another type of visual task cue, an agent-localized visual cue 550e. An agent-localized visual cue may project the task cue onto the agent (e.g., agent 525's hand in FIG. 5E). Agent may be considered part of the workstation surface as determined from visual feedback system 510, and thus projecting the visual task cue onto agent 525 may be (from the perspective of visual feedback system 510) considered the same or a part of the workstation purpose. FIG. 5F illustrates another type of visual task cue, an object-specific instruction visual cue 550f. An object-specific instruction visual cue 550f may be a projection of instructions or visual indication directly onto the object or portion of the object to which they pertain. For example, in an assembly item-handling task performed at a workstation, the object-specific instruction may highlight the portion of two items that are to be connected together.

Figure 6:
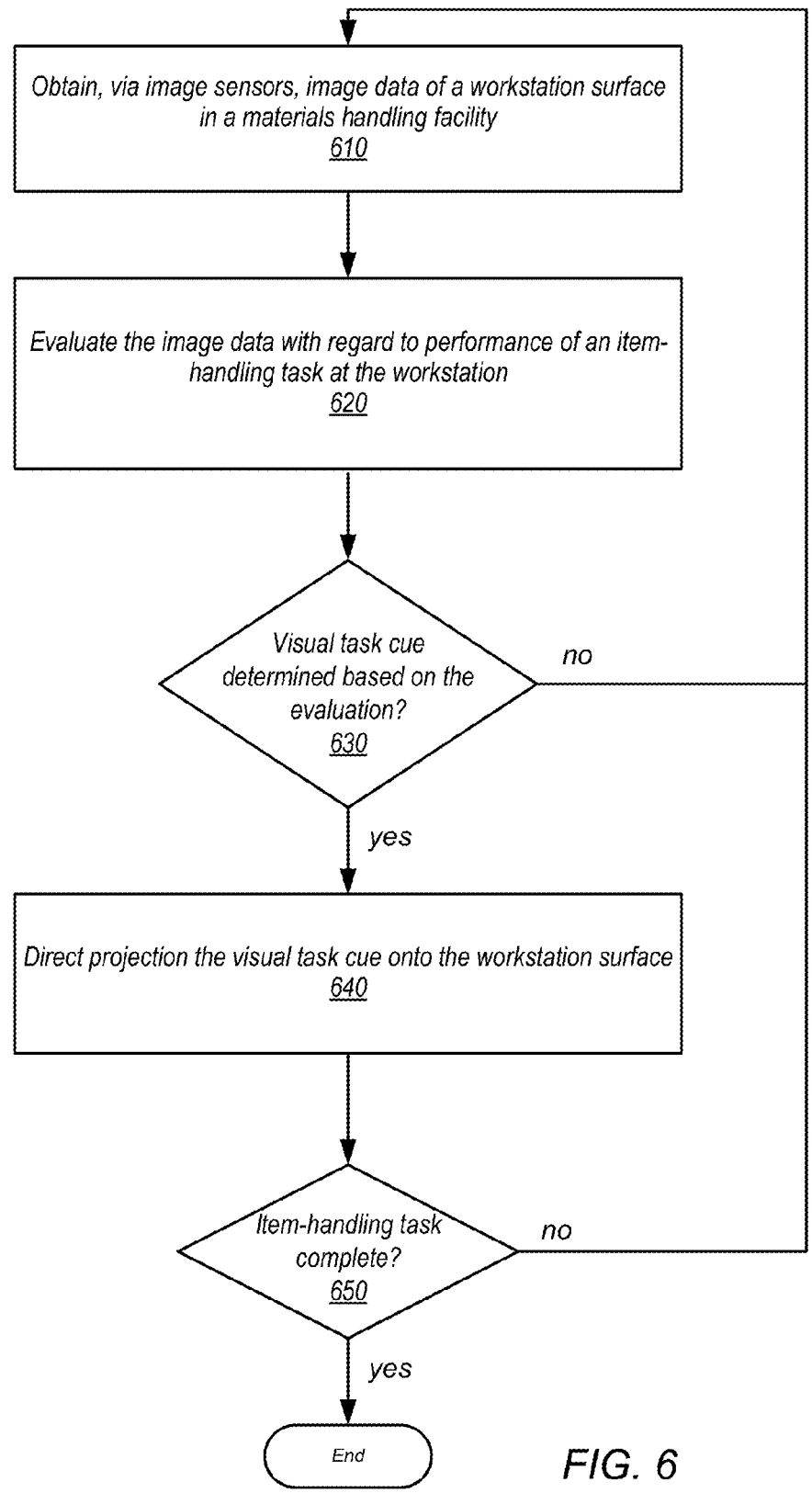
FIG. 6 is a high-level flowchart illustrating various methods and techniques for performing visual feedback for workstations in materials handling facilities, according to some embodiments.

The examples of visual task feedback for workstations in materials handling facilities discussed above with regard to FIGS. 2-5F have been given in regard to a fixed or workstation-based visual task feedback system in a materials handling facility. Various other types or configurations of visual task feedback for workstations in materials handling facilities may implement these techniques. For example, rather than a control system like control system 202 discussed above, an individual control system may be implemented for an individual workstation. In some embodiments, computing systems or devices may be physically located near a workstation, or configured to communicate with sensors and/or projectors near a workstation from a central location. Different configurations or types of sensors for image, geometric information, and/or weight may be implemented, as well as different configurations and types of projectors. FIG. 6 is a high-level flowchart illustrating various methods and techniques for performing visual feedback for workstations in materials handling facilities, according to some embodiments. The various embodiments described above, as well as other systems or configurations may implement the following techniques.

As indicated at 610, image data of a workstation surface at a workstation in a materials handling facility may be obtained via one or more image sensors, in various embodiments. Image data may include various high resolution images or video formatted, compressed, or communicated in one or more formats. Real-time or near real-time image data may be captured. Geometric information may also be obtained via one or more image and/or depth sensors (which may be one or more of the image sensors configured to determine depth or geometric information). Geometric information may also be reconstructed based on image data captured for the workstation. Depth information may also be obtained and correspond to the image data of the workstation surface such that the distance between the depth sensor and items on the workstation surface as discerned from the image data may be known. For example, the side of a box facing a depth sensor may be a certain distance away from the depth sensor, while the bare surface of the workstation sensor may be a greater distance away from the depth sensor, thus indicating a height dimension for the box. Image data and/or corresponding geometric information may be specific to a portion of the workstation surface, the entire workstation surface, and/or the environment or area surrounding the workstation surface visible to the imaging sensors. For example, imaging and/or depth sensors may only monitor a center portion of a workstation surface, a raised portion of a workstation surface, or a larger area including the workstation surface and its surrounding environment.

Weight or mass information about items on the workstation surface may also be obtained via one or more scales. For example, a scale may be embedded in workstation surface upon which items are placed (or possibly initially placed). Weight information may be obtained that is specific to a particular item on the workstation surface or all items on the workstation surface.

Figure 7:
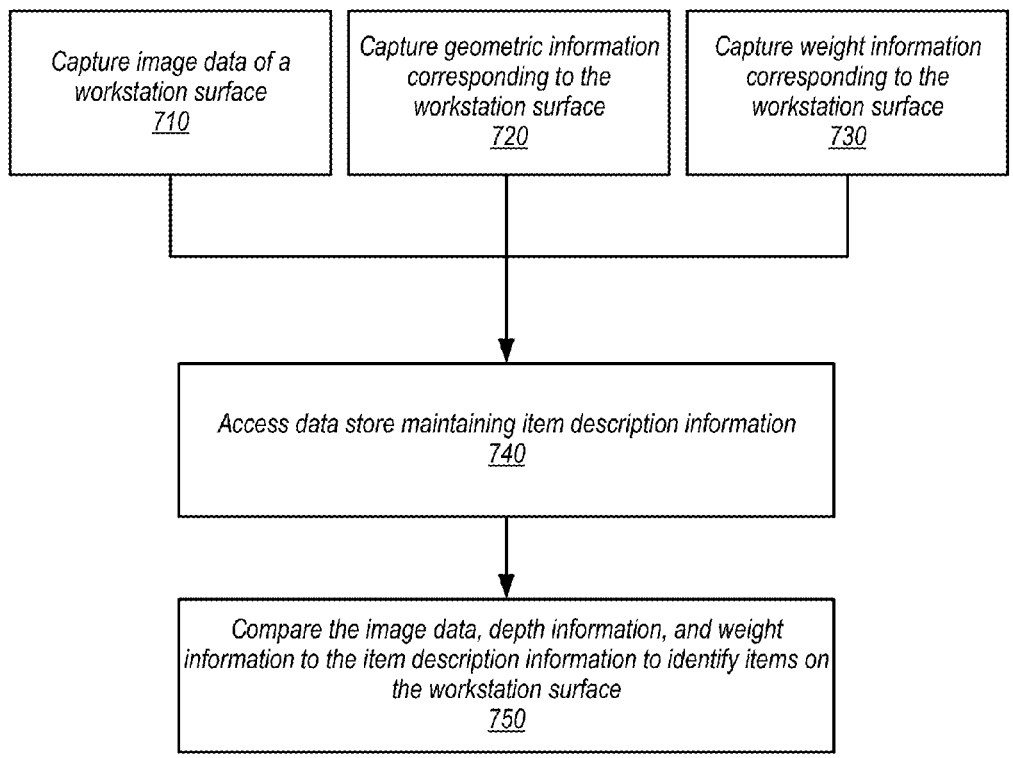
FIG. 7 is a high-level flowchart illustrating various methods and techniques for performing item recognition for items located on a workstation surface, according to some embodiments.

As indicated at 620, the image data may be evaluated with regard to a performance of an item-handling task at the workstation. For example, in some embodiments one or more items located on the workstation surface associated with an item-handling task performed at the workstation may be identified based, at least in part on the image data. Many different item recognition techniques may be performed, including, but not limited to edge matching, feature detection, or template matching. In some embodiments, image data may be analyzed to locate item identifiers (e.g., barcodes or numbers) on items on the workstation surface. Other types of information corresponding to or used in combination with image data may be used to identify items, such as depth information corresponding to the image data of the workstation surface and/or weight information indicating the weight of one or more items on the workstation surface. FIG. 7 described in more detail below discusses multiple ways in which items located on the surface of the workstation may be identified.

In some embodiments, an item may be identified as an item (as opposed to a feature of the workstation surface) but may not be recognizable as to the specific type or unit. For instance, 3 books may be located on the workstation surface. Based on a comparative analysis, 2 of 3 books may be identified and recognized as Book A and Book B (along with respective item information describing the item such as publisher, author, weight, dimensions, etc.). The remaining book however may be unrecognizable, either as the specific book title, or as a book at all. Instead, the remaining book may be identified as an unrecognizable item. As noted below, a visual task feedback cue may be selected to indicate manual entry of an item identifier of an unrecognizable item. Then, in the above example, the book may be identified as Book C (along with its respective information). In some embodiments, the items located on the workstation surface may be identified according to the item recognition techniques described herein, and the item-handling task may be performed without manual scan or entry of the items for recognition. This may lead to more efficient performance of the item handling task as a manual entry, scan, or other step to recognize items may not need to be completed.

In some embodiments, the image data may be evaluated in order to determine a current state of the performance of the item-handling task. For example, the percentage of completion or progress of the item-handling task may be identified. A particular stage of the item-handling task (e.g., preparation, assembly, or packing) may be identified. In some embodiments, the current state of the item-handling task may correspond with the performance of certain agent movements or gestures recognizable by evaluating the image data.

In some embodiments, the image data may be evaluated to recognize agent gestures with regard to the performance of the item-handling task at the workstation. For instance, certain packing motions may be recognized (e.g., obtaining a shipping container). In some embodiments, the correctness of the motions may be determined, for instance selecting the wrong shipping container or performing the gestures in an incorrect or inefficient order or manner.

As indicated at 630, a determination as to whether to project one or more visual task cues onto the workstation surface may be made based, at least in part on the evaluation of the image data, in some embodiments. Many different types of visual task cues may be determined. For example, visual task cues may indicate that specific actions are to be performed, or that erroneous items or actions have been obtained/performed. In various embodiments, the one or more visual task cues may indicate a current state of the item-handling task associated with the one or more identified items. For instance, if an item is missing or incorrect, a corresponding visual task cue indicating such a missing or incorrect item may indicate that the state of the item-handling task is incomplete. Similarly, visual task cues to manually identify items or provide input to a projected user interface may also indicate a current state of the item-handling task, such as steps or actions remaining to be performed. Indications of completion are another type of visual task cues that may be determined based on the identified items. FIG. 8 discussed in further detail below describes many techniques for determining and/or selecting visual task cues according to some embodiments. If, as indicated by the negative exit from 630, no visual task cues are determined, more image data may be again obtained and the technique may begin again. In this way, visual task cues may be provided dynamically during the performance of an item-handling task, responding to changes on the surface of the workstation.

As indicated at 640, if one or more visual task cues are determined, then projection of the visual task cues onto the surface of the workstation may be directed, in some embodiments. The visual task cues may, in some embodiments, be projected according to the image data of the workstation surface. For instance, the visual task cues may be projected onto particular locations on the workstation surface as identified via the image data. In another example, projection of the visual task cues may account for the features of the workstation surface onto which they are projected as determined according to the image data and/or geometric information, in some embodiments. For example, the projection of a visual task cue may be projected to accurately cover one or more surfaces of an item (e.g., in effect painting or highlighting the item) without being projected on other items and/or the surface of the workstation based on item dimensions calculated from item image and/or depth information. In some embodiments, a visual task cue may be selected, generated, and/or projected to neutralize portions of the workstation surface (e.g., by graying out other items).

As indicated by the positive exit from 650, if the item handling task is complete, the feedback may end (for this particular performance of the item handling task). If, however, the item-handling task is not complete (as indicated by the negative exit from 650), then the previously described elements may be repeated.

FIG. 7 is a high-level flowchart illustrating various methods and techniques for performing item recognition for items located on a workstation surface, according to some embodiments. As indicated at 710, image data of the workstation surface may be captured via imaging sensors. Imaging sensors may view some or all of a workstation surface and may be provide varying kinds of image data, such as video or still images, according to multiple different formats and resolutions. In some embodiments, depth information corresponding to the image data of the workstation surface may be captured, as indicated at 720. Geometric information may be useful to perform various different types of item recognition techniques. For instance, in some embodiments, geometric information along with image data may be used to calculate one or more item dimensions for items located on the workstation surface. Geometric information may also be used to more accurately understand the shape, outline, or profile of an item which may not be intelligible based on the image data alone. As indicated at 730, in some embodiments, weight information may also be obtained from one or more scales.

In some embodiments, a data store, such as data store 340 described above with regard to FIG. 3, may be maintained for items carried, stored, managed, or processed in a materials handling facility and may be accessed, as indicated at 740. The data store may maintain descriptive information associated with particular items in the materials handling facility that may be used to identify and recognize items. Item identifiers, item dimensions, shapes, colors, image data, weight, or any other form of descriptive information may be maintained in the data store. Once accessed, the image data, geometric information, and/or weight information may be compared with the item descriptive information in the data store to identify items on the workstation surface. For example, high resolution image data may capture item identifiers (e.g., bar codes) on the items which may be compared with item identifiers stored in the data store. Other recognition techniques comparing stored image data maintained for different items in the data store with captured image data of the workstation surface (e.g., edge detection comparisons, histogram comparisons, or other object recognition techniques) may be performed. In some embodiments, geometric information and/or weight information may be used for secondary or alternative recognition techniques. For example, if an item image comparison makes a recognition decision for an item below a certain confidence threshold, then geometric and/or weight information may be used to determine dimensions of an item on the workstation surface and/or the weight of the item on the workstation surface and compare it with dimensions and/or weight for the possible item maintained in the data store to ensure that one or both alternative recognition techniques agree.

As noted above with regard to FIG. 6, visual task cues may be determined or selected that indicate a state of the item handling task that is being performed. Different states of the item-handling task may necessitate different information or feedback be presented to an agent performing the item-handling task at the workstation surface. FIG. 8 is a high-level flowchart illustrating various methods and techniques for selecting a visual task cue to be projected onto a workstation surface, according to some embodiments.

As indicated at 810, the image data of the workstation surface may be analyzed, such as performing the comparative analysis described above with regard to FIG. 7 and/or the other techniques discussed above with regard to FIG. 6. Items located on the workstation surface may be identified based, at least in part, on the evaluation of the image data, the current state of the item-handling task may be determined, or agent gestures may be recognized. One determination that may be made is whether an item located on the workstation surface is recognizable, as indicated at 820. For instance, the image data may be able distinguish that 6 items are located on a workstation surface. By performing a comparative analysis, 5 of the 6 items may be recognized (e.g., have their corresponding item information located in an item data store by determining the item's identity). The remaining item, though it may be distinguishable from the other items and the workstation surface, may not be able to recognized using the various identification techniques. For instance, the item may be positioned on the workstation surface to reduce or hide distinguishing features (e.g., may hide a barcode or other identifier that may be recognizable). As indicated by the positive exit from 820, if the item is unrecognized, a visual task cue may be selected to indicate manual item identification is to be performed 822, such as by scanning the item identifier or entering an item identifier via an input device (e.g., scanner or keyboard). A visual task cue indicating this may be implemented in a variety of ways, such as highlighting the unrecognizable item in a particular color or projecting an arrow and/or instructions regarding the item.

As indicated at 830, in some embodiments, a determination may be made as to whether a particular item is missing from the workstation surface based on the image data. The item-handling task being performed may correspond to a particular one or more items. For example, a workstation that performs a packing process may have a set of items associated with an order that are to be packed together in a shipping container. Similarly, in another example, a workstation that performs some assembly process may have a list of items (e.g., parts) that may be required to complete the assembly process. When item identification is performed, the identified items may be checked or compared against the particular item(s) corresponding to the item-handling task. If an item is missing, as indicated by the positive exit from 830, a visual task cue may be selected that indicates that an item is missing 832. For example, a general warning or indication, such as a visual task cue that paints a bright color across a substantial portion of the workstation surface may be projected. Or, in another example, an empty space on the workstation surface may be highlighted and may include textual information describing the missing item.

In some embodiments, a missing item may be an item that is determined for the item-handling task at the time of performing the item-handling task. For example, in some embodiments, the workstation may be a pack workstation, such as described above with regard to FIGS. 2-5F, where an item-handling task to pack together items into a shipping container may be performed. A determination may be made based on image, depth, weight, and/or other data used to identify the items (as discussed above with regard to FIGS. 6 and 7) to select (or recommend) a shipping container (e.g., corrugated box or other shipping container). This determination may be made in real or near-real time. In some embodiments, the selection of the shipping container may replace a previously selected (or recommended) shipping container for the item(s). Thus, in some embodiments, the visual task cue indicating the missing item may identify the selected shipping container as the missing item.

As indicated at 840, a determination may be made that a particular item is incorrect (or extraneous) for performing the item-handling task. Similar to 830 above, the item-handling task being performed may correspond to a particular one or more items. When item identification is performed, the identified items may be checked or compared against the particular item(s) corresponding to the item-handling task. If an item is incorrect (e.g., not associated with the task or necessary to perform the task), as indicated by the positive exit from 840, then a visual task cue indicating an incorrect item 842 may be selected. For example, the incorrect item may be highlighted or painted a particular color (e.g., red) by the projected visual task cue.

In some embodiments, visual task cues may be selected that indicate various levels of completion of an item-handling task. For example, as indicated at 850, in some embodiments, a determination may be made that all items are complete (or present) for the performance of the item handling task, and a corresponding visual task cue may be selected indicating that all items are complete (or present) for the performance of the item handling task. Consider again the pack workstation example, if all of the items associated with the order to be packed in a shipping container are identified, then a visual cue may be selected and projected that indicates that the remaining portion of the task (packing the items into the shipping container) may be completed. Some visual task indicators may indicate that an item-handling task is not yet complete. For example, in some embodiments, the image data of the workstation surface may be analyzed to determine whether each step of an item-handling task is complete. If a step is skipped, the visual task cue may indicate that the item-handling task is incomplete (and may provide an indication as to the skipped step).

Please note that visual task cues discussed above with regard to FIG. 8 are not intended to be limiting, as many other different visual task cues may be selected for projection onto the workstation surface. Additionally, combinations of different visual task cues may also be projected. Visual task cues may be projected at the same or different times. In some embodiments, visual task cues may be projected in such a way as to indicate an order or sequence of steps or operations to be performed as part of the item handling task. For example, in an assembly item-handling task, a visual task cue indicating the next item to be used for assembly may be highlighted. Similarly, in another example, packing order may be determined for items to be placed into a shipping container. The visual task cues may be projected onto the workstation surface in order to indicate the packing order. For instance, each next item to place in the shipping container may be illuminated.

Another example of a visual task cue may be selecting a visual task cue that operates as a user interface. For instance, in some embodiments, a user interface may be projected onto the workstation surface (e.g., asking for confirmation or indications of certain task performance decisions or actions taken by an agent). Imaging sensors and/or depth sensors may be used to recognize agent gestures as input action to the user interface such as by touching or placing an object over or above an input in the user interface, which may then be recognized via image data and/or depth information as a selection or input.

Item-handling processes may entail many changes to or interactions with the workstation surface or environment. New items may be added or work may be performed on the surface (e.g., packing, assembling, or other manual techniques where agents and/or tools operated by agents may enter the workstation surface space). Changes to the workstation surface may distort or modify visual task cues projected onto the workstation surface. FIG. 9 is a high-level flowchart illustrating various methods and techniques for adjusting projected visual task cues based on additional image and depth information for a workstation surface, according to some embodiments. As indicated at 910, a visual task cue may be projected onto a workstation surface. For instance, a particular item or items may be highlighted, or instructions or text may be displayed. Based, at least in part, on image data and corresponding depth information of the workstation surface, a surface change may be detected, as indicated at 920, in some embodiments.

A surface change may, in various embodiments, be a change to the depth information corresponding to the surface of a workstation as perceived by a depth sensor monitoring a workstation surface. As noted above, geometric information for a workstation surface may indicate the distance between the depth sensor and the workstation surface. Objects on the workstation surface may decrease the distance between the workstation surface and the depth sensor by appearing to raise the height of the workstation surface (from the perspective of the depth sensor) to the height of the object intervening between the surface of the workstation and the depth sensor (e.g., the top of a box sitting on a workstation surface is perceived to be a higher elevation than the bare workstation surface on which it rests). Thus, a surface change may be the addition of a new item onto the workstation surface (e.g., a box, tool, or item to be included in the item handling task that changes the depth for the surface) or the movement of an already present item to a different location on the workstation surface. Stacking an item or box on top of another item is another example surface change that may be detected. More generally, any object that intervenes between or occludes a depth sensor and a workstation surface (e.g., an agent's limb, such as a hand, arm, etc.), even if only temporarily, may be a detectable surface change. A surface change may also be a detected change in the environment of the workstation, such as a change in the lighting of the workstation.

As indicated at 930, in response to detecting the surface change of the workstation surface, one or more projection modifications may be determined, in some embodiments. For example, the location, size, shape, and/or coloration of the visual task cue may be adjusted. If an item is flipped or rotated differently on a workstation surface, the shape of the visual task cue that corresponds to the shape of the item may be correspondingly adjusted, for instance. In some embodiments, one or more other projection devices may project the visual task cue from a different vantage point, and thus modifications to the visual task cue to be properly displayed when projected from the different vantage point may be made.

As indicated at 940, the visual task cue projected onto the workstation surface may be updated according to the projection modifications. For example, the adjustments to the projected location, size, shape, and/or coloration of the visual task cue may be made to shift, resize, reshape, and/or recolor the visual task cue. The method described above with regard to FIG. 9 may be performed dynamically. For example, imaging sensors and/or depth sensors may monitor a workstation surface while a control system may dynamically detect the surface change, determine modifications, and update projected visual tasks cues for multiple detected surface changes in or near-real time. If, for instance, an agent's hand blocks the projection of a visual task cue while over the workstation surface, one or more other projectors may project the visual task cue from a vantage point that would not be occluded by the agent's hand. When the agent's hand is removed from over the workstation surface, the visual task cue may be projected again according to its originally determined location, size, or other characteristic before modification.

Figure 10:
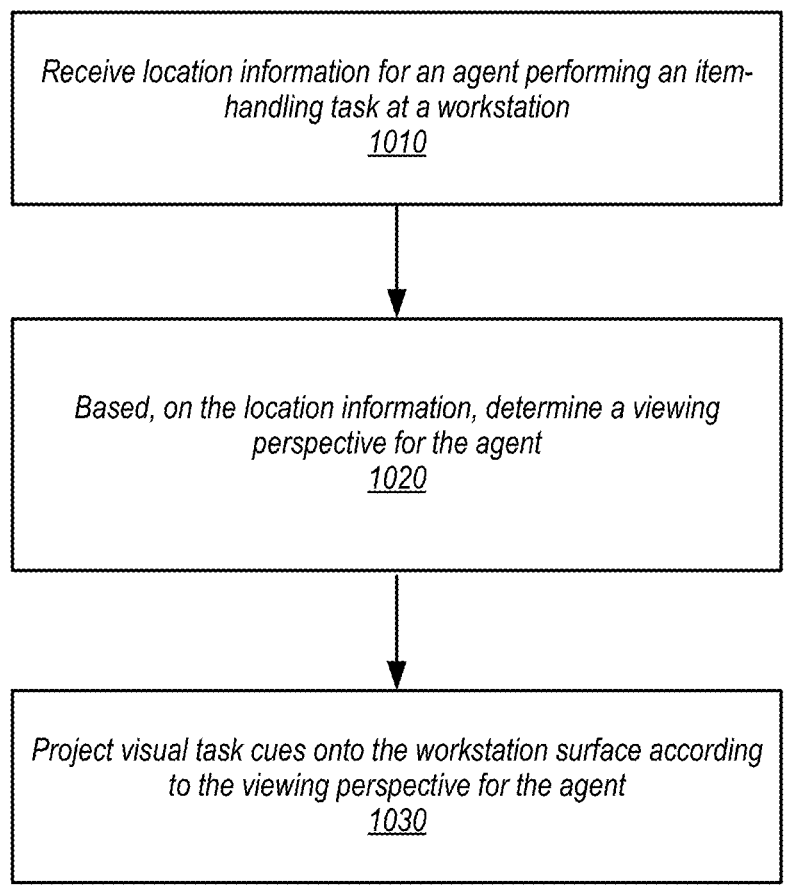
FIG. 10 is a high-level flowchart illustrating various methods and techniques for projecting a visual task cue based on a viewing perspective of an agent at a workstation, according to some embodiments.

While performing item-handling tasks, agents may physically relocate to different portions of a workstation surface and/or view different portions of a workstation surface differently. With an agent's view of the workstation surface changing due to these differing views or locations, visual task cues projected onto a workstation surface may not be optimally displayed, understandable, or even visible at all. FIG. 10 is a high-level flowchart illustrating various methods and techniques for projecting a visual task cue based on a viewing perspective of an agent at a workstation, according to some embodiments.

As indicated at 1010, location information for an agent performing an item-handling task at a workstation in a materials handling facility may be received. Various types of location information for an agent may be received via agent tracking sensors. For example, in some embodiments eye tracking or gaze tracking techniques (e.g., using a remote eye tracking device) may be implemented to determine the location on the workstation surface that an agent is currently viewing to perform a task (e.g., looking a particular item), and/or a particular angle from which the agent is viewing the workstation surface. Similarly, in some embodiments, video tracking or other location tracking techniques that may be implemented to determine an agent's location relative to a workstation surface.

As indicated at 1020, based, at least in part, on the received location information, a viewing perspective for the agent may be determined. For example, a determination may be made as to an agent's field of view. If, for instance, an agent is closely viewing a particular item on a workstation surface, the agent's field of view may be limited as to a portion of the workstation surface. This portion of the workstation surface may be geographically determined as a viewing perspective for the agent. Other techniques, such as determining the location and/or direction of an agent's head relative to the workstation surface, in order to determine a viewing perspective, may also be used.

In various embodiments, visual task cues may be projected onto the workstation surface according to the viewing perspective for the agent, as indicated at 1030. In some embodiments, a default version of a visual task cue (e.g., image or animation) may be implemented. The default version of the visual task cue may then be modified according to the viewing perspective of the agent, such that from the agent's perspective the projected visual task cue appears to be the same as the default version of the visual task cue. Thus, the viewing perspective of an agent may also be used to project visual task cues in a way that is intelligible to the agent. For instance, if textual information is projected as part of a visual task cue, the viewing perspective for the agent may be used to determine an orientation of the textual information that is readable (e.g., not upside-down) from the perspective of the agent. Other visual task cues may rely upon the viewing perspective of the agent to achieve a particular effect, such as an anamorphic visual task cue (which may appear 3-dimensional to the agent when viewed from a particular vantage point, such as an anamorphosis). Other examples that account for determined agent viewing perspectives when projecting visual task cues may include projection of visual task cues that would not be within an field of view for an agent currently that may be modified to be included in the field of view for the agent (e.g., if a shaded or banded area around the item is the visual task cue, the size of the shaded or banded area may be increased). In another example, additional visual task cues may be displayed to signal and/or direct the gaze of an agent to the visual task cue, such as by projecting an arrow or other directional symbol within the field of view of the agent, or projecting a large scale flash or other signal that the agent can view and interpret as a signal to look for the visual task cue. Similar to FIG. 9 discussed above, changes in location information may result in determining updated viewing perspectives for an agent, with the projection of currently projected visual task cues updated to correspond to the new viewing perspective, in some embodiments.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various control systems, managers and/or other components, such as those that implement the workstation visual feedback system described herein). The various methods as illustrated in the figures and described herein represent example embodiments of methods. The order of any method may be changed, and various elements may be added, reordered, combined, omitted, modified, etc.

Embodiments of visual task feedback for workstations in materials handling facilities as described herein may be executed on one or more computer systems, which may interact with various other devices. FIG. 11 is a block diagram illustrating an example computer system, according to various embodiments. For example, computer system 2000 may be configured to implement a control system in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, block-based storage devices, or any other persistent storage device. Computer system 2000 (or a distributed application or operating system operating thereon) may store instructions and/or data in persistent storage devices 2060, as desired, and may retrieve the stored instruction and/or data as needed.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a control system, in different embodiments.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 or various sensors, projectors or other components, for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A materials handling facility, comprising:
    one or more imaging sensors, wherein the one or more imaging sensors include a sensor configured to capture geometric information of a workstation surface that corresponds to image data of the workstation surface;
    one or more visual projectors;
    a control system, configured to:
        receive, from the one or more imaging sensors, image data of the workstation surface in the materials handling facility, wherein the geometric information corresponding to the image data is received along with the image data from the one or more imaging sensors;
        evaluate the image data to identify one or more items located on the workstation surface associated with an item-handling task performed at the workstation, wherein to evaluate the image data to identify the one or more items located on the workstation surface, the control system is further configured to:
            access a data store maintaining item description information regarding items handled in the materials handling facility; and
            perform a comparative analysis based at least in part on the image data of the workstation surface of the image data and the item description information to identify the one or more items located on the workstation surface;
        based, at least in part, on the one or more identified items, select one or more visual task cues to project onto the workstation surface, wherein the one or more visual task cues indicate a current state of the item-handling task associated with the one or more identified items; and
        direct the one or more visual projectors to project the one or more visual task cues onto the workstation surface.

2. The materials handling facility of claim 1, wherein the selected one or more visual task cues include at least one of:
    an indication that an item associated with the item-handling task is missing from the workstation surface;
    an indication that a particular one of the identified one or more items located on the workstation surface is incorrect for performance of the item handling task;
    an indication that a particular one of the one or more items located on the workstation surface requires manual identification; or
    an indication that the identified one or more items are complete for performance of the item handling task.

3. The system of claim 1, wherein the materials handling facility includes a plurality of different workstations including the workstation, wherein different ones of the plurality of different workstations perform at least one different respective item-handling task, wherein the control system is configured to perform said receiving, said evaluating, said selecting, and said directing for at least some of the different ones of the plurality of different workstations in the materials handling facility.

4. A method, comprising:
performing, by one or more computing devices:
obtaining, via one or more imaging sensors, image data of a surface of a workstation in a materials handling facility;
evaluating the image data of the workstation surface with regard to a performance of an item-handling task performed at the workstation;
receiving location information for an agent performing the item-handling task at the workstation;
based, at least in part, on the location information, determining a viewing perspective for the agent;
based, at least in part, on the evaluation of the image data with regard to the performance of the item-handling task, determining one or more visual task cues to project onto the workstation surface; and
directing the projection of the one or more visual task cues onto the workstation surface, wherein said directing the projection of the one or more visual task cues onto the workstation surface is performed such that the one or more visual task cues are projected according to the viewing perspective of the agent.

5. The method of claim 4, wherein said evaluation comprises performing at least one of:
identifying one or more items located on the workstation surface for the performance of the item-handling task;
determining a current state of the performance of the item-handling task; or
recognizing an agent gesture at the workstation associated with the performance of the item-handling task.

6. The method of claim 5, wherein said identifying the one or more items located on the workstation surface associated with the item handling task performed at the workstation, comprises:
accessing a data store maintaining item description information regarding items handled in the materials handling facility; and
comparing the image data and the item description information to identify the one or more items located on the workstation surface.

7. The method of claim 6, further comprising:
obtaining, via the one or more imaging sensors, geometric information of the workstation surface corresponding to the image data;
based, at least in part on the geometric information and the image data, calculating one or more item dimensions for the one or more items; and
wherein said comparing the image data and the item description information to identify the one or more items located on the workstation surface includes comparing the one or more item dimensions as part of said comparison.

8. The method of claim 5, wherein said recognizing the agent gesture at the workstation associated with the performance of the item-handling task, comprises:
detecting an agent gesture with regard to a user interface projected on the workstation surface as an input action for the user interface.

9. The method of claim 4, further comprising:
obtaining, via the one or more imaging sensors, additional image data of the workstation surface and geometric information of the workstation surface corresponding to the additional image data;
based, at least in part, on the additional image data of the workstation surface and the geometric information corresponding to the additional image data obtained from the one or more imaging sensors, detecting a surface change of the workstation surface that interferes with at least one of the projected one or more visual task cues;
determining one or more projection modifications for the at least one visual task cue; and
updating the at least one visual task cue projected onto the workstation according to the one or more projection modifications.

10. The method of claim 4, wherein the one or more visual task cues are projected in an order indicating a sequence of actions for the performance of the item handling task.

11. The method of claim 4, further comprising performing a respective one or more audio task cues in coordination with said projection of the determined one or more visual task cues.

12. The method of claim 4, wherein the materials handling facility includes a plurality of different types of workstations each performing at least one different respective item-handling task, wherein the one or more computing devices perform said obtaining, said evaluating, said determining, and said directing for at least some of the plurality of different types of workstations in the materials handling facility.

13. A non-transitory, computer-readable storage medium, storing program instructions that when executed by one or more computing devices cause the one or more computing devices to at least implement:
obtaining, via one or more imaging sensors, image data of a surface of a workstation in a materials handling facility;
evaluating the image data of the workstation surface with regard to a performance of an item-handling task at the workstation based, at least in part on the image data of the workstation surface, wherein in said evaluating the image data of the workstation surface with regard to the performance of the item-handling task at the workstation, the program instructions cause the one or more computing devices to at least implement:
identifying one or more items located on the workstation surface associated with the item handling task performed at the workstation, comprising:
accessing a data store maintaining item description information regarding items handled in the materials handling facility, and
comparing the image data and the item description information to identify the one or more items located on the workstation surface;
based, at least in part, on the evaluation of the image data of the workstation surface, determining one or more visual task cues to project onto the workstation surface; and
directing the projection of the one or more visual task cues onto the workstation surface.

14. The non-transitory, computer-readable storage medium of claim 13, wherein the program instructions further cause the one or more computing devices to at least implement:
obtaining, via the one or more imaging sensors, geometric information of the workstation surface corresponding to the image data;

based, at least in part on the geometric information and the image data, calculating one or more item dimensions for the one or more items; and wherein said comparing the image data and the item description information to identify the one or more items located on the workstation surface includes comparing the one or more item dimensions as part of said comparison.

15. The non-transitory, computer-readable storage medium of claim 13, wherein the program instructions further cause the one or more computing devices to at least implement:

obtaining, via a scale configured to weigh objects on the workstation surface, weight information for the workstation surface;

wherein said comparing the image data and the item description information to identify the one or more items located on the workstation surface includes the weight information of the workstation surface as part of said comparison.

16. The non-transitory, computer-readable storage medium of claim 13, wherein said identifying the one or more items located on the workstation surface associated with the item handling task performed at the workstation is performed without receiving item information for the one or more items via a manual item scan.

17. The non-transitory, computer-readable storage medium of claim 13, wherein the program instructions further cause the one or more computing devices to at least implement:

obtaining, via the one or more imaging sensors, additional image data and geometric information of the workstation surface corresponding to the additional image data;

based, at least in part, on the additional image data of the workstation surface and the additional geometric information, detecting a surface change of the workstation surface that interferes with at least one of the projected one or more visual task cues;

determining one or more projection modifications for the at least one visual task cue; and updating the at least one visual task cue projected onto the workstation according to the one or more projection modifications.

18. The non-transitory, computer-readable storage medium of claim 13, wherein in said evaluating the image data of the workstation surface with regard to the performance of the item-handling task at the workstation, the program instructions cause the one or more computing devices to at least implement:

recognizing an agent gesture at the workstation associated with the performance of the item-handling task;

wherein the determined one or more visual task cues indicate correctness of the agent gesture for performing the item-handling task.

19. The non-transitory, computer-readable storage medium of claim 13, wherein the materials handling facility includes a plurality of different types of workstations each performing at least one different respective item-handling task, wherein the one or more computing devices perform said obtaining, said evaluating, said determining, and said directing for at least some of the plurality of different types of workstations in the materials handling facility.

20. The non-transitory, computer-readable storage medium of claim 13, wherein the workstation is a packing workstation, wherein the item-handling task is a packing process to pack one or more items together into a shipping container, and wherein the program instructions further cause the one or more computing devices to at least implement:

based, at least in part, on the image data of the workstation surface, selecting the shipping container from a plurality of different shipping containers; and wherein the one or more visual task cues include an indication to identify the selected shipping container for the one or more items.

* * * * *